US006824664B1

(12) United States Patent
Austin et al.

(10) Patent No.: US 6,824,664 B1
(45) Date of Patent: Nov. 30, 2004

(54) ELECTRODE-LESS DIELECTROPHORISES FOR POLARIZABLE PARTICLES

(75) Inventors: Robert H. Austin, Princeton, NJ (US); Jonas O. Tegenfeldt, Princeton, NJ (US); Edward C. Cox, Princeton, NJ (US); Chia Fu Chou, Chandler, AZ (US); Olgica Bakajin, Washington, DC (US)

(73) Assignee: Princeton University, Princeton, NJ (US)

( * ) Notice: Subject to any disclaimer, the term of this patent is extended or adjusted under 35 U.S.C. 154(b) by 0 days.

(21) Appl. No.: 09/707,892

(22) Filed: Nov. 6, 2000

Related U.S. Application Data

(60) Provisional application No. 60/163,523, filed on Nov. 4, 1999.

(51) Int. Cl.[7] .......................... C02F 1/40; C25B 11/00; G01N 27/27

(52) U.S. Cl. .............................................. 204/643

(58) Field of Search .......................................... 204/643

(56) References Cited

U.S. PATENT DOCUMENTS 5,427,663 A 6/1995 Austin et al. ............ 204/180.1
5,605,662 A 2/1997 Heller et al. ............... 422/68.1
5,795,457 A 8/1998 Pethig et al.
5,814,200 A 9/1998 Pethig et al.
5,993,632 A 11/1999 Becker et al.
6,017,696 A 1/2000 Heller
6,051,380 A 4/2000 Sosnowski et al. ............ 435/6
6,056,861 A 5/2000 Fuhr et al.
6,071,394 A 6/2000 Cheng et al. ............... 204/547
6,117,660 A * 9/2000 Walters et al. .............. 205/701
6,120,666 A * 9/2000 Jacobson et al. ........... 137/807
6,156,273 A * 12/2000 Regnier et al. ............. 204/450
6,203,683 B1 3/2001 Austin et al.
6,294,063 B1 * 9/2001 Becker et al. .............. 204/450
6,344,325 B1 * 2/2002 Quake et al. ............ 435/286.6
6,358,387 B1 * 3/2002 Kopf-Sill et al. ........... 204/602
6,368,871 B1 * 4/2002 Christel et al. ............. 436/180

FOREIGN PATENT DOCUMENTS

JP 01285184 A 11/1989

OTHER PUBLICATIONS

Green and Morgan, J. Phys. D: Appl. Phys. 30, (1997) L41–L84, "Dielectrophoretic Separation of Nano–particles".*

(List continued on next page.)

*Primary Examiner*—Mark L. Bell
*Assistant Examiner*—Jennine Brown
(74) *Attorney, Agent, or Firm*—Mathews, Collins, Shepherd & McKay, P.A.

(57) ABSTRACT

The present invention further provides a device for the integrated micromanipulation, amplification, and analysis of polarized particles such as DNA comprises a microchip which contains constrictions of insulating material for dielectrophoresis powered by an alternating current or direct current signal generator, and attached to a hot source that can be heated to specific temperatures. Nucleic acids can be heated and cooled to allow for denaturation, and the annealing of complementary primers and enzymatic reactions, as in a thermocycling reaction. After such a reaction has been completed at the constriction, the dielectrophoretic field can be switched to a direct field to release the product and direct it through a matrix for fractionation. The device includes data analysis equipment for the control of these operations, and imaging equipment for the analysis of the products. The invention permits the efficient handling of minute samples in large numbers, since reactions occur while sample material is trapped between constrictions. Because the positioning, reactions, and release into a fractioning matrix all occur at the constriction which serves as a focusing locus, the need to transfer samples into different tubes is eliminated, thus increasing the efficiency and decreasing the possibility of damage to the samples.

25 Claims, 15 Drawing Sheets

OTHER PUBLICATIONS

Ramos, MOrgan, Green and Castallanos, J. Colloid and Interface Science 217, (1999), 420–422, "AC Electric Field Induced Flu Flow in Microelectrodes".*

Asbury and Engh, Biophys. J., 74, No. 2, (1998) 1024–1030, "Trapping of DNA in Nonuniform Oscillating Electric Fields".*

Hughes, Seventh Foresight Conference on Molecular Nanotechnology (Nanotechnology), (1999), "AC Electrokinetics: Applications for Nanotechnology".*

Pethig, R., Dielectrohoriesis: "Using Inhomogeneous AC Electrical fields to Separate and Manipulate Cells", Critical Reviews in Biotechnol, 1996, vol. 16, Iss 4, pp. 331–348.

Rousselet, J., et al., "Directional Motion of Brownian Particles Induced by a Periodic Asymmetric Potential", Nature (London) 1994, pp. 370, 446–448.

Green, N.G. et al., "Dielectrophoresis of Submicrometer Latex Spheres. 1. Experimental Results",Journal of Physical Chemistry B, 1999, vol. 3, Issue 1., pp. 41–50.

Markx, G.H. et al. "Separation of Viable and Non–Biable Yeast Using Dielectrophoresis", Journal of Biotechnology , 1994, vol. 32, pp. 29–37.

Morgan, H. et al., Separation of Submicron Bioparticles by Dielectrophoresis, Biophysical Journal, vol. 77, Jul. 1999, pp. 516–525.

Yang, J., Gascoyne PRC Cell Separation on Microfabricated Electrodes Using Dielectrophoric/Gravitational Field Flow Fractionation, Analytical Chemistry, vol. 71, No. 5, Mar. 1999, pp. 911–918.

Washizu, M., et al. "Electrostatic Manipulation of DNA in Microfabricated Structures", IEEE Transactions on Industry Applications, vol. 26, No. 6, Nov./Dec. 1990, pp. 1165–1172.

Washizu, M., et al., "Molecular Dioelectrophoresis of Biopolymers", IEEE Transactions on Industry Applications, vol. 30, No. 4, Jul./Aug. 1994. pp. 835–843.

Washizu, M., et al. "Applicaions of Electrostatic Stretch–and–Positioning of DNA", IEEE Transactions on Industry Applications, vol. 31, No. 3, May/Jun. 1995, pp. 447–456.

Asbury, C.L., et al. "Trapping of DNA in Nonuniform Oscillating Electric Fields", Biophysical Journal, vol. 74, Feb. 1998, pp. 1024–1030.

Gorre–Talini, L. et al., "Dielectrophoretic Ratchets", Chaos, vol. 8, No. 3, Sep. 1998, pp. 650–656.

Becker, Frederick F., et al., Separation of Human Breast Cancer Cells From Blood by Differential Dielectric Affinity, Procedures of the National Academy of Science USA, vol. 92, Jan. 1995, pp. 860–864.

Yue, Vincent, et al., "Miniature Field–Flow Fractionation System for Analysis of Blood Cells", Clin. Chem 40/9, 1994, pp. 1810–1814.

* cited by examiner

ELECTRODE-LESS DIELECTROPHORISES FOR POLARIZABLE PARTICLES

CROSS-REFERENCE TO RELATED APPLICATIONS

This application claims priority of U.S. Ser. No. 60/163,523 filed Nov. 4, 1999, which is incorporated in it's entirety by reference herein.

GOVERNMENTAL RIGHTS

This application funded in part by a grant from the National Institute of Science, Grant No. PHS 1R01GM55453, and PHS HG01506, and the U.S. government holds certain rights to this invention.

BACKGROUND OF THE INVENTION

1. Field of the Invention

The present invention relates generally to microfluidic chips and methods for performing electrodeless purification, concentration, trapping and launching of polarizable particles or molecules in fractionating devices or chemical/amplification/detection devices by dielectrophoresis. The novel devices utilize dielectrophoresis technology achieved by using insulating constrictions without the use of metal electrodes and exploiting low frequency polarizability of particles or molecules. In particular, the polarizable particles and molecules include but are not limited to, cells, viruses, polymer particles, colloids and molecules such as proteins, peptides, carbohydrates, and polynucleotides, in particular, single-stranded or double-stranded DNA or RNA. The invention also relates to a device for thermocycling polarizable particles, in particular for amplification of nucleic acids. Specifically, the invention involves trapping minute amounts of nucleic acids in a microfabricated, dielectrically focused device, thermocycling them, and releasing them for fractionation or analysis.

2. Description of the Related Art

One of the great challenges in biotechnology is how to move and concentrate molecules in a micro-fabricated environment. One possible technique is dielectrophoresis (DEP) in which the translation of neutral matter is caused by polarization effects in a nonuniform electric field, see Polh, H. A., Dielectrophoresis: The Behavior of Neutral Matter in Nonuniform Electric Fields, Cambridge University Press, Cambridge, UK, (1978) and Pethig, R., Dielectrophoresis: Using Inhomogeneous AC Electrical Fields to Separate and Manipulate Cells, Crit. Rev. Biotechnol. Vol. 16, Iss. 4, pp. 331–348, (1996).

DEP has been used for sample manipulation at the molecular level. Applications of DEP include: separation of colloidal particles, as described in Rousselet, J. et al., Directional Motion of Brownian Particles Induced by a Periodic Asymmetric Potential, Nature (London), 370, pp. 446–448, (1994) and Green, N. G. et al., Dielectrophoresis of Submicrometer Latex Spheres Experimental Results, J. Phys. Chem. B, Vol. 103, Iss. 1, pp. 41–50, (1999); DEP ratchet, as described in Gorre-Talini, L. et al., Dielectrophoretic Pratchets, Chaos 8: (3) pp. 650–656 (September 1998); DEP coating, as described in Choi, W. B. et al., Field Emission from Silicon and Molybdenum Tips Coated with Diamond Powder by Dielectrophoresis, Appl. Phys. Lett., Vol. 68, Iss. 6, pp. 720–722, (1996); separation of yeast, as described in Markx, G. H. et al., Separation of Viable and Non-Viable Yeast Using Dielectrophoresis, J. Biotechnol. 23:29–37; separation of virus, as described in Morgan, H. et al., Separation of Submicron Bioparticles by Dielectrophoresis, Biophys. J. 77: pp. 516–525, (1999); separation of cancer cells, as described in Becker, F. F. et al., Separation of Human Breast-Cancer Cells from Blood by Differential Dielectric Affinity, Proc. Nat. Acad. Sci. (USA), Vol. 92, Iss. 3, pp. 860–864, (1995) and Yang, J. et al., Cell Separation on Microfabricated Electrodes Using Dielectrophoretic/Gravitational Field Flow Fractionation, Anal. Chem., Vol. 71, Iss. 5, pp. 911–918, (1999); and trapping and manipulation of DNA, as described in Washizu, M. et al., Electrostatic Manipulation of DNA in Microfabricated Structures, IEEE Trans. Ind. Appl., 26: pp. 1165–1172, (1990), Washizu, M. et al., Molecular Dielectrophoresis of Biopolymers, IEEE Trans. Ind. Appl. 30:835–843, (1994), Washizu, M. et al., Applications of Electrostatic Stretch-and-Positioning of DNA, Vol. 31, pp. 447–456 (1995), and Asbury, C. L. et al., Trapping of DNA in Nonuniform Oscillating Electric Fields, Biophysical Journal, 74:1024–1030 (1998).

The essence of dielectrophoretic trapping is that a dielectric object will be trapped in the regions of high field gradient provided there is sufficient dielectric response to overcome thermal energy and the electrophoretic force. A conventional method to make a DEP trap is to create an electric field gradient by an arrangement of fine planar electrodes either: directly connected to a voltage source; as described in Rousselet, J., et al., Directional Motion of Brownian Particles Induced by a Periodic Asymmetric Potential, Nature (London), 370, 446–448, (1994) and Green, N. G. et al., Dielectrophoresis of Submicrometer Latex Spheres Experimental Results, J. Phys. Chem. B, Vol. 103, Iss. 1, pp. 41–50, (1999); or free floating, as described in Washizu, M. et al., Molecular Dielectrophoresis of Biopolymers, IEEE Trans. Ind. Appl. 30:835–843, (1994); Washizu, M. et al., Applications of Electrostatic Stretch-and-Positioning of DNA, Vol. 31, pp. 447–456 (1995); and Asbury, C. L. et al., Trapping of DNA in Nonuniform Oscillating Electric Fields, Biophysical Journal, 74:1024–1030 (1998).

U.S. Pat. No. 6,117,660 describes a method of treating material with electrical fields and with an added treated substance. A plurality of electrodes are arrayed around the material to be treated and are connected to outputs of an electrode selection apparatus. Inputs of the electrode selection apparatus are connected to outputs of an agile pulse sequence generator. A treating substance is added to the membrane-containing material. Electrical pulses are applied to the electrode selection apparatus and are routed through the electrode selection apparatus in a predetermined, computer-controlled sequence to selected electrodes in the array of electrodes, whereby the membrane containing material is treated with the added treating substance and with electrical fields of sequentially varying directions.

U.S. Pat. No. 6,071,394 describes a method for performing channel-less separation of cells by dielectrophoresis, lysis and diagnostic analyses. A cartridge including a microfabricated silicon chip on a printed circuit board and a flow cell mounted to the chip forms a flow chamber. The cartridge also includes output pins for electronically connection the cartridge to an electronic controller. The chip includes a plurality of circular microelectrodes which are preferably coated with a protective permeation layer which prevents direct contact between an electrode and a sample introduced into the flow chamber and enables immobilization of specific antibodies for specific cell capture. The amplification of nucleic acids is central to the current field of molecular biology. Library screening, cloning, forensic analysis, genetic disease screening and other increasingly powerful techniques rely on the amplification of extremely small amounts of nucleic acids. As these techniques are reduced to a smaller scale for individual samples, the number of different samples that can be processed automatically in one assay expands dramatically. For further improvements, new integrated approaches for the handling and assaying of a large number of small samples are needed.

With the polymerase chain reaction (PCR) for nucleic acid amplification, a purified DNA polymerase enzyme is used to replicate the sample DNA in vitro. This system uses a set of at least two primers complementary to each strand of the sample nucleic acid template. Initially, the sample nucleic acid is heated to cause denaturation to single strands, followed by annealing of the primers to the single strands, at a lower temperature. The temperature is then adjusted to allow for extension of the primers by the polymerase along the template, thus replicating the strands. Subsequent thermal cycles repeat the denaturing, annealing and extending steps, which results in an exponential accumulation of replicated nucleic acid products.

PCR represents a considerable time savings over the replication of plasmid DNA in bacteria, but it still requires several hours. PCR also has limitations in the subsequent handling of the product. Most reactions occur isolated in a test tube or plate containing the require reagents. Further analysis of these products entails removing them from the tube and aliquoting to a new environment. Significant delay and loss and damage to the product may result from such a transfer. Emerging technology in the display of nucleic acids in arrays on chips, for further identification and selection, requires a more precise method of transfer of samples from amplification step to chip than is possible by dispensing the contents of each reaction tube individually.

Another disadvantage of PCR is the requirement of a reaction tube which has a volume possible too large for the amplification of particularly minute amounts of starting template and other reagents. PCR is able to amplify just one molecule of template, but the volume of the reaction mixture makes this goal difficult to achieve. The nature of the reaction tube also requires a signification volume of the other reagents. Conventional PCR involves heating and cooling the reaction tube several times for each cycle, requiring elaborate instrumentation to control the temperature of the apparatus which holds the tubes, and the tubes and solutions they contain, over time.

Lab-on-a-chip or biochip technology for manipulating DNA on a small scale is a recent development in the art. For example, Austin et al., U.S. Pat. No. 5,427,663, describes a microlithographic array for fractionating macromolecules. Heller, U.S. Pat. No. 5,605,662 describes a microfabricated device having DC microelectrodes for DNA hybridization. Individual wires in a direct electrophoretic field have been used to focus and launch DNA into separation media.

Microfabricated devices can be used for PCR. Wilding, et al. (Clin.Chem. 40:1815–8, 1994) designed a photolithographed, sealed silicon chip which can receive reagents by capillary action and can be mounted on a Peltier heater-cooler. This design reduces reagent volumes, but requires an external source for heating and does not couple positioning and manipulation of the nucleic acids, and so amplification and subsequent analysis on a fractionation matrix cannot be achieved without transfer of samples. Thus, prior art systems for the amplification of nucleic acids do not integrate micromanipulation and amplification steps, such that the need for transfer steps reduces the quantity and quality of the products, and time and labor are increased.

In another field, dielectrophoresis has been used to position cells and molecules on a micron scale. Washizu and Kurosawa, IEEE Transactions on Industry Applications, 26(6): 1165–1172, 1990, and Washizu et al., IEEE Transactions and Industry Application, 31(3): 447–455, 1995, used high voltage ($10^4$ V/cm) and high frequency (1 MHz) alternating currents to generate a dielectric field in a micron-sized floating electrode. Alignment, permanent fixation, stretching, and cutting of DNA molecules was described. Asbury and van den Engh (Biophys. J. 74:1024–30, 1998) report a sealed device having an array of 100 strips of gold which, when placed in an oscillating field, reversibly traps DNA along the edges of the strips.

U.S. Pat. No. 6,051,380 describes a self-addressable, self-assembling microelectronic device designed and fabricated to actively carry out and control multi-step and multiplex molecular biological reactions in microscopic formats. The device can subsequently control the transport and reaction of analytes or reactants at the addressed specific microlocations. The device is able to concentrate analytes and reactants, remove non-specifically bound molecules, provide stringency control for DNA hybridization reactions and improve the detection of analytes. The device has an array of electronically programmable and self-addressable microscopic locations. Each microscopic location contains an underlying working direct current (DC) or DC/AC microelectrode supported by a substrate. The surface of each microlocation has a permeation layer for the free transport of small counter-ions, and an attachment layer for the covalent coupling of specific binding entities. The device has a matrix of addressable microscopic locations on its surface. Each individual micro location is able to electronically control and direct the transport and attachment of specific binding entities (e.g., nucleic acids, antibodies) to itself. All microlocations can be addressed with their specific binding entities.

The above-described systems have the limitation that the use of metallic electrodes on the microchip requires complex manufacturing steps such as metal evaporation during fabrication. There is a need to develop an effective technique for moving and concentrating polarizable particles without the use of metal electrodes.

SUMMARY OF THE INVENTION

The present invention further provides a device for the integrated micromanipulation, amplification, and analysis of polarized particles such as DNA comprises a microchip which contains constrictions of insulating material for dielectrophoresis powered by an alternating current or direct current signal generator, and attached to a hot source that can be heated to specific temperatures. Nucleic acids can be heated and cooled to allow for denaturation, and the annealing of complementary primers and enzymatic reactions, as in a thermocycling reaction. After such a reaction has been completed at the constriction, the dielectrophoretic field can be switched to a direct field to release the product and direct it through a matrix for fractionation. The device includes data analysis equipment for the control of these operations, and imaging equipment for the analysis of the products. The invention permits the efficient handling of minute samples in large numbers, since reactions occur while sample material is trapped between constrictions. Because the positioning, reactions, and release into a fractioning matrix all occur at the constriction which serves as a focusing locus, the need to transfer samples into different tubes is eliminated, thus increasing the efficiency and decreasing the possibility of damage to the samples.

This invention relates to a microfluidic device for trapping nucleic acids by dielectrophoresis, thermocycling them on the electrode, and then releasing them and fractionating through a gel, or other medium, for analysis. The invention avoids the need for an external thermocycling device, reduces the volume and amount of starting materials and reagents, and reduces the time and manipulations needed to complete an amplification protocol and sequencing.

This arrangement improves prior nucleic acid amplification steps by decreasing the required time and reagent volume. The entire apparatus is contained on a monolithographic wafer. Because the reactions take place in such a small volume, and the nucleic acid templates are positioned directly on the actual heat source, as opposed to in a tube isolated from the heat source, the time for temperature changes to perform PCR is significantly reduced.

The use of an integrated device for dielectric focusing, to position the micromolecule templates for amplification and for subsequent analytical steps such as fractionation by size or sequencing, eliminates the need for transferring samples between these steps. When the samples are released from the constrictions, they can be electrophoresed through an adjacent matrix to achieve fractionation. These coupled reactions are suitable for multisample arrays, such as standard plates which are multiples of 96-sample arrangements.

This invention satisfies a long felt need for an integrated microfabricated device suitable for thermocycling of polarizable particles using minimal starting materials, in a minute volume, and permits amplification and fractionation of DNA without transfer.

The dimensions of the field electrodes are not critical so long as the field electrodes produce the desired dielectrophoretic field. Conventional gold electrodes may be used, as can other metals having the desired characteristics of inertness with respect to electrolysis of the electrode. The width or thickness of the electrodes can be in the range of about 100 $\mu$m to about 1 mm, preferably from about 200 $\mu$m to about 500 $\mu$m, for example 250 $\mu$m.

The substrate chip is typically quartz or silicon dioxide, for ease of manufacture and transparency suitable for microscopic examination, but other materials and composites now known or later discovered could be used, for example glass, silicon nitride, or polymers. The constrictions may be silicon dioxide, polymide, PMMA or other suitable inert materials that can be deposited or machined with the requisite accuracy.

The cover for the chip may be glass, quartz, polymers or other suitable material, preferably transparent at least in the regions where observation of the microchannels is required. The cover may be integral or removable, depending primarily on the manufacturing process.

In the most preferred embodiment, the polarizable particle is DNA, while in other embodiments it might be a protein, or other biological or synthetic polymer. With DNA, the buffer solution preferably contains suitable salts and buffers, such as ½×TBE, TAE, MOPS, SDS/Tris/glycine, or TAPS.

For microreactions with polarizable particles other than nucleic acids, the material can be trapped at the constrictions by dielectrophoresis, subjected to desirable microreactions, including thermal cycling as needed, and then released and fractionated. For example, a polymerase protein may be focused and trapped together with nucleic acid to facilitate polymerization.

In summary, the invention relates to a device for selectively trapping, thermocycling, and releasing polyelectrolytes, comprising: (a) a microlithographic substrate having a microfluidic channel dimensioned to accommodate a fluid, (b) field electrodes positioned to provide a dielectrophoretic field along the channel in response to an alternating current, (c) constrictions positioned between the field electrodes, the field electrodes and constrictions being capable of fluid communication with each other via the channel, and (d) circuitry controlling current to the field electrodes, whereby a polarizable particle in solution may be (i) trapped at the constrictions when an alternating field is applied to the field electrodes, (ii) heated when a field is applied to the constriction, and (iii) released when the trapping alternating field is not applied.

A method for thermal cycling of a polarizable particle comprises: (a) placing the polarizable particle in solution in a channel adjacent to a constriction, (b) trapping the polarizable particle between contstrictions by applying a dielectrophoretic field to the solution, and (c) releasing the polarizable particle by removing the dielectrophoretic field, and further heating the polarizable particle by applying a current to a resistor or peltier, and removing the current and allowing the nucleic acid to renature. The polarizable particle may be nucleic acid, denatured on heating.

The method may further comprise determining the sequence of the nucleic acid by reacting the trapped nucleic acid with amplification reagents, allowing nucleic acid amplification to occur, releasing the polarizable particle by removing the dielectrophoretic field, fractionating the nucleic acid, and scanning the fractions. A plurality of samples can be processed simultaneously in separate devices. The method can include fractionating and/or analyzing the released polarizable particle by electrophoresis such as in a field produced by the field electrodes.

DETAILED DESCRIPTION

Figure 1A:
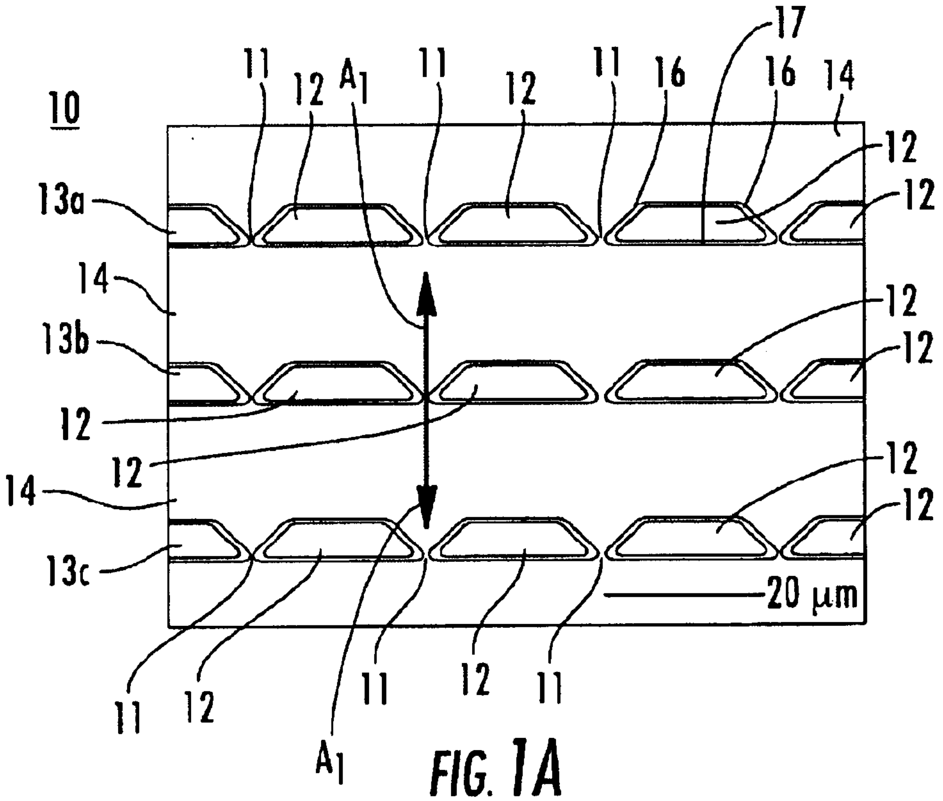
FIG. 1A is a schematic diagram of the device of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

The present invention comprises devices and methods for performing electrode-less concentration, trapping and launching of polarizable particles by dielectrophoresis, which can be conducted on a single chip.

FIG. 1A is a schematic diagram of a portion of a microfluidic device 10 in accordance with the teachings of the present invention. A plurality of dielectric constrictions 12 are formed in rows 13*a*–13*c* on substrate 14. Adjacent dielectric constrictions 12 have gap 11 there between. Adjacent rows 13*a*–13*c* of dielectric constrictions 12 form channel 14 there between. Dielectric constrictions 12 can be formed of a dielectric material such as quartz or silicone. Dielectric constrictions 12 can have a trapezoidal shape with edges 16 angled from bottom edges 17. Angled edges are preferable for directing flow of polarizable particles into the area between adjacent constrictions 12. Alternatively, dielectric constrictions can be formed of different shapes, such as triangles, half circles, polygons, and the like. The size of substrate 14 can be in the range of about 0.5×0.5 cm to about 5×5 cm, preferably about 1×1 cm.

Distance $D_1$ of gap 11 between adjacent constrictions 12 is selected to be substantially the same or a predetermined amount larger than a diameter of the polarizable particles to allow polarized particles to be trapped between adjacent dielectric constrictions 12 upon application of an electric field. For example, a suitable size for dielectric constrictions 12 is a width in the range of about 0.1 $\mu$m to about 5.0 $\mu$m and a height of about 0.5 $\mu$m to about 300 $\mu$m, preferably a width of about 1 $\mu$m and a height of about 1.25 $\mu$m for trapping single stranded or double stranded DNA. Distance $D_2$ is formed between adjacent rows 13*a*–13*c* of constrictions 12. Distance $D_2$ can be altered to vary the strengths of the electric field. For example, distance $D_2$ can be in the range of about 10 $\mu$m to about 80 $\mu$m. Alternatively, distance $D_2$ can extend a substantial length of substrate 14, for example up to 50 mm. As an example, an applied voltage of IV over the chip by Ohms Law ($\sigma$E=J, $\sigma$, is the conductivity, E is the electric field and J is the current density and conservation of charge the resulting electric field for distance $D_1$ of 1 $\mu$m and distance $D_2$ of 40 $\mu$m is 40 V/cm.

Figure 1B:
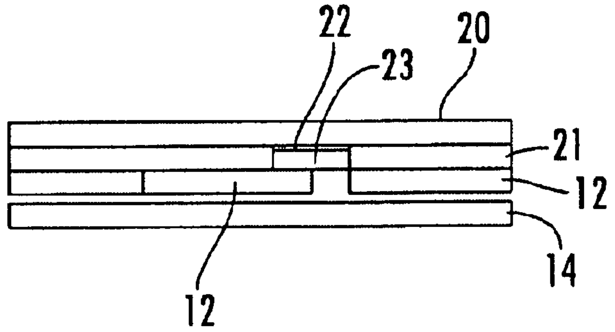
FIG. 1B is a side view of the device with an attached cover.

Cover 20 is sealed to substrate 14, as shown in FIG. 1B. Cover 20 can be sealed to substrate 14 with layer 21. Layer 21 can be for formed of an elastomer such as a silicone elastomer, such as PDMS, (eg. General Electric RTV 615). Channel 22 is formed in layer 21 for receiving polarizable particles 23.

Figure 1C:
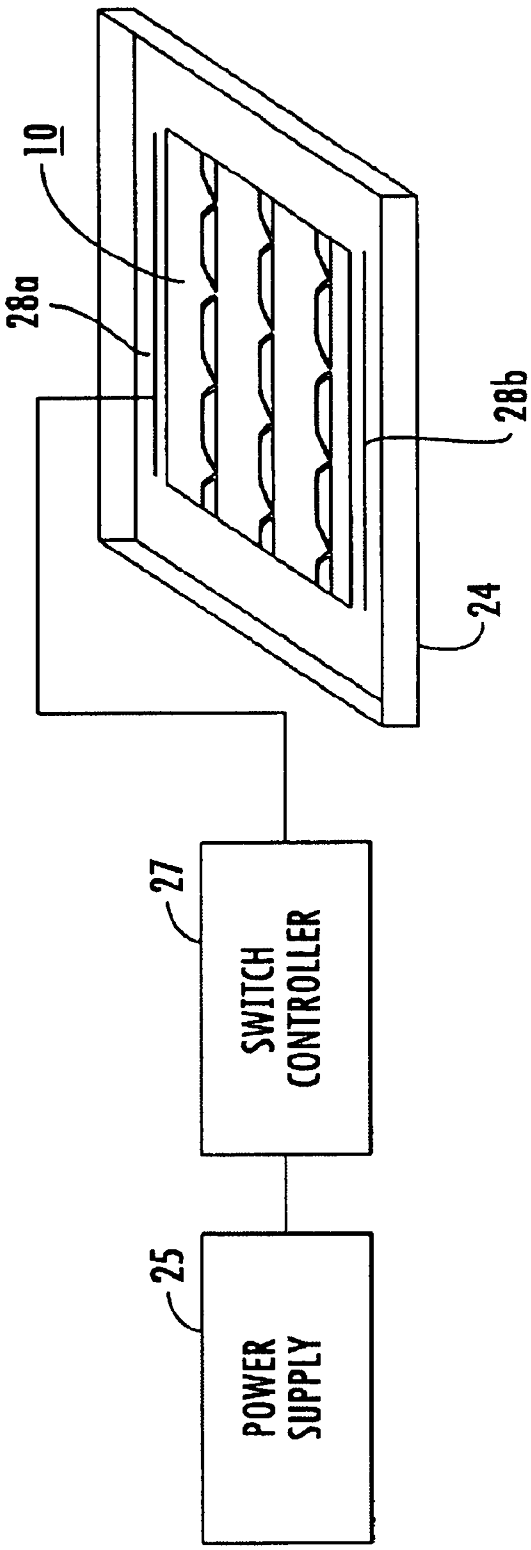
FIG. 1C is a schematic diagram of a system for application of an electric field to the device.

Microfluidic device 10 is received in fluid reservoir 24 as shown in FIG. 1C. For example, fluid reservoir 24 can contain a buffer solution. Suitable buffer solutions include 0.5×TBE 0.5×TBE (45 mM TRIS 1 mM EDTA titrate to pH8.0 using boric acid), TAE (40 mM TRIS 1 mM EDTA titrate to pH 8.0 using acetic acid), TE (45 mM TRIS 1 mM EDTA; titrate to pH 8.0 using HCl). Power supply 25 is controlled by switch controller 27 to generate current to electrode 28*a* in fluid reservoir 24. Electrode 28*b* is a ground electrode. Power supply 25 provides either direct current (DC), alternating current (AC) or combination of DC/AC. Upon application of current, dielectric electric field E 26 is generated in the direction of arrows $A_1$. A wide range of applied voltages can be applied by power supply 25 depending on the sample to be concentrated. In one embodiment, the applied voltage is between about 0V to about 1 KV per cm. Those skilled in the art are capable of determining the suitable voltages necessary using standard electrical measurements and samples known in the art. A wide range of applied frequencies can be applied to the microfluidic device depending upon the sample being analyzed and its requirements for detection and measurement. Those skilled in the art are capable of determining the suitable frequencies necessary using standard electrical measurements known in the art. In one embodiment, the applied frequency is DC to about 1 Ghz. In another embodiment, the applied frequency is between about 10 Hz and about 100 K Hz.

Figure 1D:
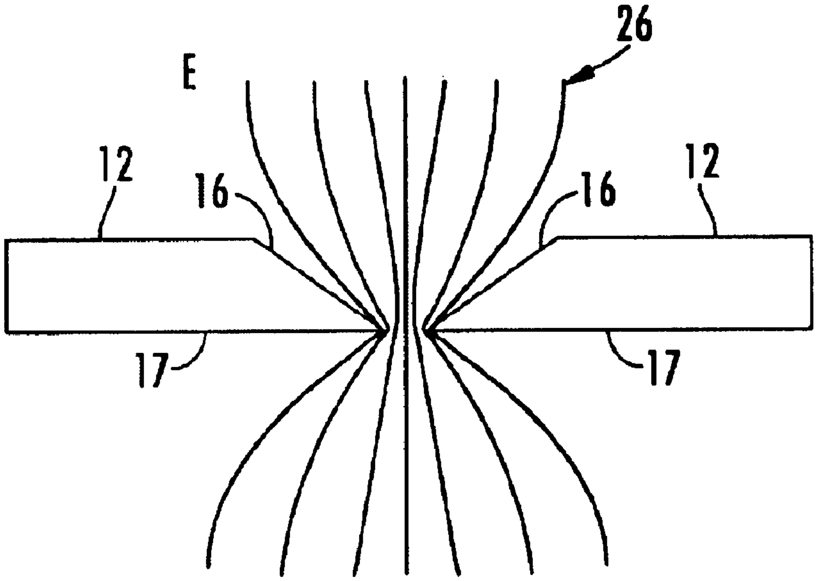
FIG. 1D is a schematic diagram of the effect on the electric field by a constriction of the device.

FIG. 1D illustrates a schematic diagram of the effect of constriction 12 on dielectric electric field E 26. Constriction 12 essentially confines the current to a smaller cross section, thereby increasing the current density. By Ohm's law ($\sigma$E=J, $\sigma$ is the conductivity, E is the electric field and J is the current density) the electric field scales with the current density and hence is increased at the constrictions. The DEP force can be adjusted accordingly by varying the shape and cross-section of dielectric constriction 12, distance $D_1$ between constrictions 12 and distance $D_2$ between rows 13*a*–13*c* of constrictions. It has been found that a strong dielectrophoretic force requires that the product of the electric field and the electric field gradient be large.

In the absence of an external electric field the charged groups along a polymer such as DNA are effectively neutralized by a counterion cloud. It is believed that in the presence of an external field the following events occur: 1) movement of ions in the fluid shears away the counterions at the zeta potential surface giving rise to a net charge density a along the length of the polymer; and 2) a counterion charge distribution becomes polarized giving rise to a dielectric moment p. Since the origin of the dipole moment is due to electrophoretic movement of the counterions within the zeta potential surface along the backbone or the polymer the induced dipole moment is a function of time and the size of the polymer. The polymer becomes similar to a capacitor, which is "charged" by the movement of the polymers along the backbone, resulting in an effective charge couple ±Q separated by the radius of gyration of polymer $R_g$. An applied voltage gradient E(t) can be used to drive the separation, so the molecule resembles a charging capacitor of area ${R_g}^2$, plate separation $R_g$ and effective dielectric constant $\in$ is represented by: dielectric constant $\in$ is represented by:

$$E(t) = \frac{Q(t)}{\varepsilon R_g^2} - \frac{dQ(t)}{dt}\kappa R_g^2 \tag{1}$$

where κ is the effective resistivity of the ions within the sheath surrounding the molecule. The resistivity κ of the ion sheath is a function of the density ρ and mobility $\mu_i$ of the ions which move along the backbone of the DNA, in this application the possibility of charge conduction through the molecular backbone itself is ignored such that:

$$\kappa = \frac{1}{\rho\mu_i} \tag{2}$$

$\mu_i$ is proportional to the charge on the ion q and is inversely proportional to the frictional coefficient for moving ions through solution. The frictional coefficient can be estimated to be roughly equal to the Stoke's drag on a sphere of radius a in a solvent of viscosity η, such that κ is scaled as:

$$\kappa = \frac{6\pi\eta_a}{q\rho} \tag{3}$$

In the frequency domain the charge response of the molecule has an in phase (real) response due to the resistivity of the sheath and an out of phase (imaginary) response due to the capacitative integration of charge at the ends of the molecule. The solution in the frequency domain to Eq. 1 for the charge Q(ω) is:

$$Q(\omega) = E(\omega)\frac{R_g}{(1+\rho R_g^4\omega^2)} + i\frac{\omega R_g^2}{(1+\rho R_g^4\omega^2)} \tag{4}$$

The effective dipole moment $p(\omega)=Q(\omega)R_g$ has an in phase (real) and out of phase (imaginary) response to the applied field. The in phase component is the component parallel to the applied field and is the component that gives rise to the dielectophoretic force. The induced dipole moment is rewritten in terms of the dielectric susceptibility of the molecule as:

$$p = QR_g = \alpha E = \left[\frac{R_g^2}{(1+\rho R_g^4\omega^2)} + i\frac{\omega R_g^3}{(1+\rho R_g^4\omega^2)}\right]E \tag{5}$$

The total force acting on a polyectrolyte in an external electric field is a sum of the electrophoretic force $F_e$ due to the net effective charge density β of the polymer and the delectrophoretic force $F_d$ due to the induced dipole moment p described above. The electrophoretic force $F_e$ on a polyelectrolyte in the presence of a electric field is proportional to the applied electrical field E as:

$$F_e = \mu_p E \tag{6}$$

where $\mu_p$ is the electrophoretic mobility of the polymer. The polarization potential energy U(z,w) of a polar molecule in an applied field E(z,w) is:

$$U(z,w) = -p\cdot E = -\alpha(w)/2(E)^2 \tag{7}$$

where α is the relative polarizability of the molecule. The gradient in the potential energy U(z,w) gives rise to a dielectrophoretic force $F_d$ as:

$$F_d = -grad(U) = (\alpha/2)grad(E)^2 = \alpha|E|\frac{dE}{dz} \tag{8}$$

Where |E| is the scalar magnitude of the field. Accordingly, the dielectric force is a nonlinear force as a function of E, and hence at sufficiently high field strengths and sufficiently low ratios of ρ/α a gradient can trap a molecule even in a static DC field, since the dielectrophoretic force will ultimately be greater than the linear electrophoretic force.

At a finite temperature T the thermal energy kT serves to broaden the distribution of molecules trapped in a potential well. In the present invention, a DNA molecule is driven by diffusional motion and average drifting velocity v due to the external DEP force $F_d$ and the external electrophoretic force $F_e$. The diffusional coefficient D and the average velocity v of a particle in the presence of and applied force F are linked through Einstein's relation v=DF/kT, where D is the Brownian diffusion coefficient of a DNA molecule and kT the thermal energy. The flux of DNA molecules J(z,t) at point z is governed by the modified Fick's equation as:

$$J(z) = \frac{DF}{kT}\cdot n(z) - Dgradn(z) \tag{9}$$

Where n(z) is the local concentration of DNA molecules. At equilibrium J(x)=0, the distribution of DNA molecules n(x) obeys a Boltzman distribution: $n(z)=n_0\exp[-U(z)/kT]$ where $n_0$ is the density of DNA molecules at the minimum of the potential well. DNA trapping only occurs when U>kT and the Clausius-Mosotti (CM) factor is positive (positive DEP). DNA is repelled from high gradient field areas when the CM factor is negative (negative DEP). DNA density across constrictions is scanned in the direction shown in FIG. 1A, the computation of effective forces is from Eq.9 as:

$$F(z) = kT\frac{gradn(z)}{n(z)} \tag{10}$$

The effective force is a combination of dielectrophoresis and electrophoresis.

Figure 1E:
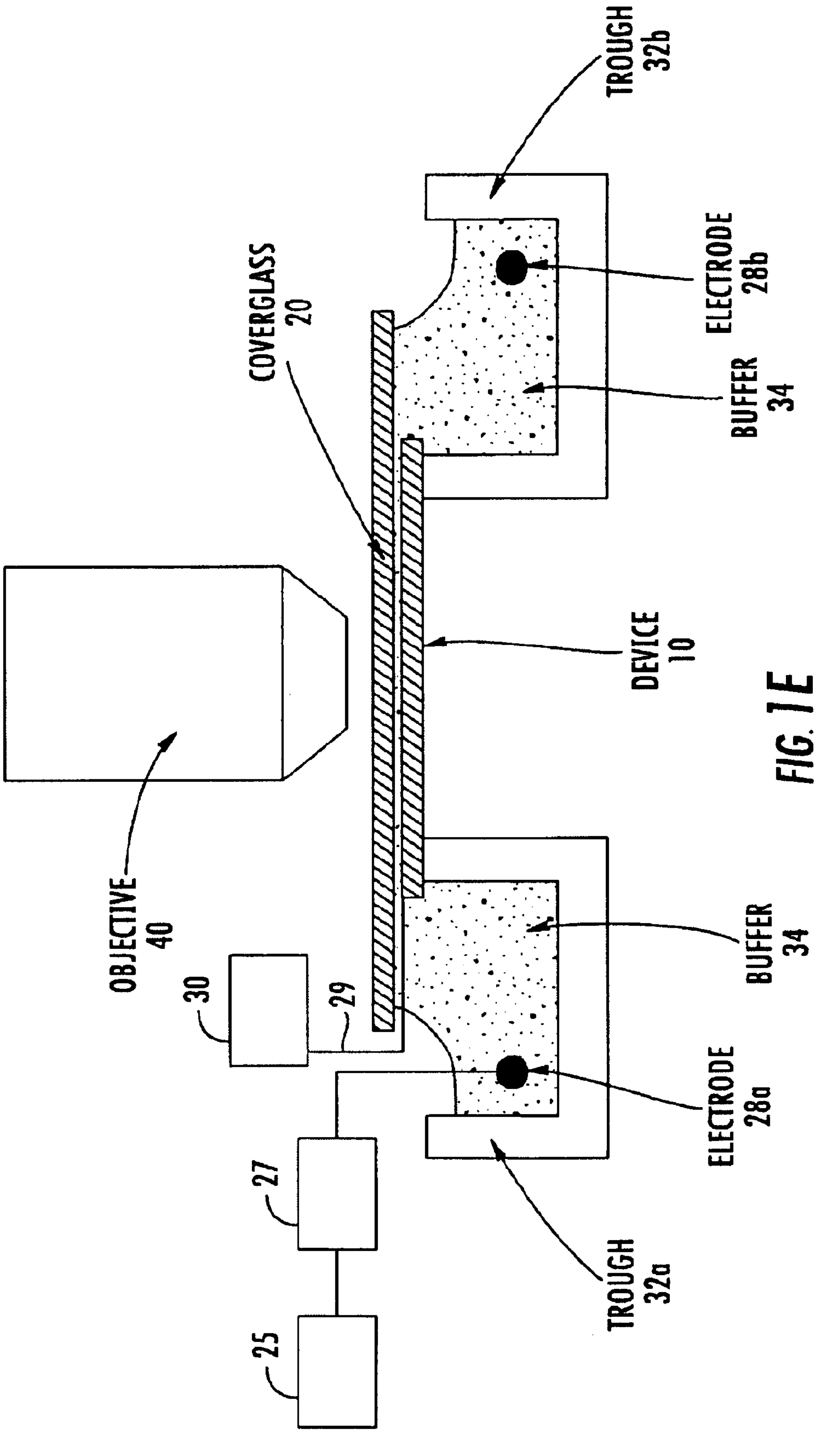
FIG. 1E is a schematic diagram of an alternative system for application of an electric field to the device.

FIG. 1E is a schematic diagram of alternate embodiment of application of electric field 26 to microfluidic device 10. Electrode 28*a* is connected to switch controller 27 and is positioned in trough 32*a*. Electrode 28*b* the ground electrode is received in trough 32*b*. Buffer 34 is received in trough 32*a* and 32*b*. Objective 40 observes device 10 during operation, for example objective 40 can be a microchip. During operation, as electrode field E 26 is driven with power supply 25, inlet 22 receives fluid 29 from fluid input means 30. Fluid input means 30 encompasses any means known or to be known that enable the fluid to move toward inlet 22. For example, but not by way of limitation, fluid input means 30 is a device that forces fluid 29 through inlet 22 using pressure. Alternatively, input fluid means 30 is a device that forces fluid through inlet 22 using electric fields. In one embodiment, fluid input means 30 is a syringe pump (such as but not limited to, the KD Scientific Syringe Pump, Model KD2100) to deliver fluid 29 through the device at non-pulsating rate ranging from about 1 μl/hr to about 300 μl/hr.

Figure 1F:
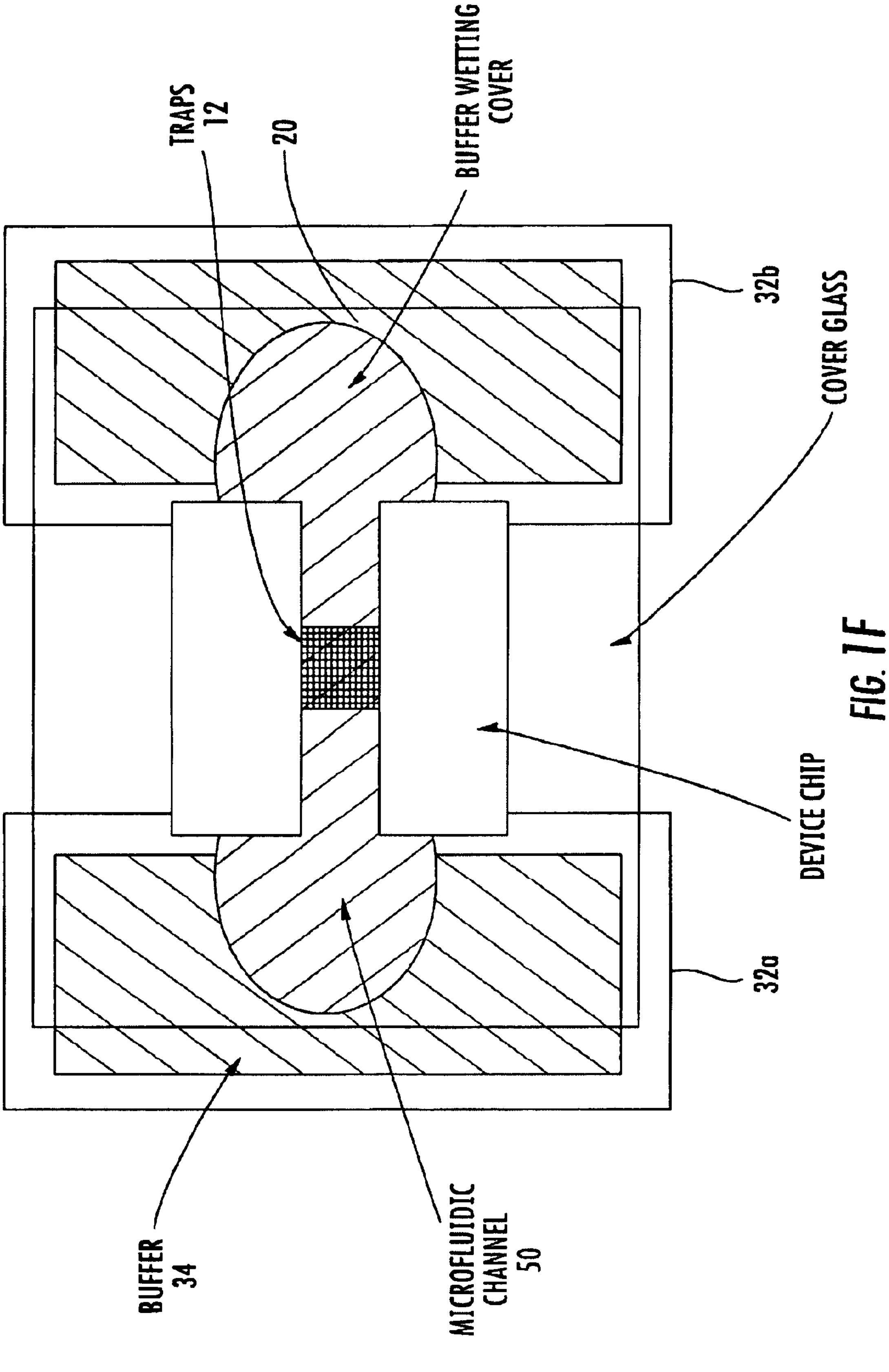
FIG. 1F is a shematic diagram of an alternate embodiment of the device of the present invention including a microfluidic channel.

FIG. 1F is a top view of an alternative embodiment including microfluidic channel 50 formed in device 10. Cover 20 extends over device 10 and a portion of troughs 32*a* and 32*b*.

The word fluid 29 is defined as any liquid. The fluid 29, is exemplified, but not limited to, liquids, such as water, organic solvents, cell cultures, animal or human bodily fluids, solutions comprising particles, solutions comprising biological molecules, cellular cytoplasm, cellular extracts, cellular suspensions, solutions of labeled particles or biological molecules, solutions comprising liposomes, encapsulated material, or micelles, etc. As understood in the art, a liquid "is the state of matter in which a substance exhibits a characteristic readiness to flow, little or no tendency to disperse, and relatively high incompressibility" (*The American Heritage Dictionary*, New College ed., (1982) p. 761).

In another embodiment of the invention, fluid 29 further comprises polarizable particles. As used herein, particles are defined as any small amount of material having polar properties. By way of example, but not by way of limitation, particles are any polymer particle, such as polystyrene particles or beads, metal colloids (e.g., gold colloidal particles), magnetic particles, dielectric particles, nanocrystals of materials, and bioparticles, such as spores, pollen, cellular occlusions, precipitates, intracellular crystals, etc.

In still another embodiment of the invention, the fluid contains biological molecules, such as but not limited to, polynucleotides such as DNA and RNA, polysaccharides, polypeptides, proteins, lipids, peptidoglycan, and any other cellular components.

In an embodiment of the invention, the fluid 29 comprises viruses, such as but not limited to, viruses capable of infecting any organisms including microorganisms, plants, or animals, in particular, mammals, and preferably humans. Any virus capable of being detected by an alteration in the electrical characteristics of a fluid 29 is encompassed by the present invention. Further, viruses in the categories of viruses with or without coats, and viruses categorized as DNA or RNA viruses, either double stranded or single stranded are encompassed by the present invention.

In yet another embodiment, fluid 29 further comprises one or more biological cells. The biological cells are either procaryotic and/or eucaryotic cells. Examples of procaryotic cells include, but are not limited to, bacteria etc. Preferably, biological cells are eucaryotic cells having a nucleus. Examples of eucaryotic cells are, but not limited to, fungal, plant, and animal cells. In particular, the cells are mammalian cells, most preferably human cells. In more particular embodiments, the mammalian or human cells may be cells for example, from blood, liver, kidney, lung, or any other tissue or organ. In another preferred embodiment, the cells are tumor or cancer cells, which can be either benign or malignant cancer cells.

For example, dielectrical constrictions 12 can be etched in substrate 14 with conventional etching techniques. The device can be fabricated using UV lithography and reactive ion etching. Crystalline quartz 3" wafers polished on both sides supplied by Hoffman Materials (321 Cherny Street, Carlisle, Pa. 17013-0726) can be used for substrate 14. The wafers have a specified surface roughness 10 Å rms to ensure well-defined channels as a metal etch-mask is used. Aluminum preferably can be used due to ease of evaporation and dry-etching. 2000 Å aluminum is thermally evaporated onto the quartz wafers. The aluminum surface is treated with hexamethyldisilazane (HMDS) in a Yield Engineering Systems LP-III Vacuum Oven to promote adhesion of the photoresist. Shipley S1813 photoresist is spun on the aluminum coated quartz wafer at 4000 rpm in 60 s with a 3 s ramp. A preexposure bake at 115° C. for 60 s is used. The wafers are exposed in a projection aligner (GCA 6300 DSW Projection Mask Aligner, 5× g-line Stepper). The 5× projection aligner images the mask on the wafer with a 5 fold demagnification; the g-line refers to the g-line (in the mercury spectrum with wavelength 436 nm). The exposure time was determined to be 0.6 s After development in MicroPosit CD26 (tetramethylammoniumhydroxide solution in water) available from Shipley Company, L.L.C., 1457 MacArthur Road, Whitehall, Pa. 18052-5711 for 60 s the aluminum was etched using a modified PK1250 from PlasmaTherm with a C12, BC13, CH4 chemistry. The resist is removed in an oxygen plasma (Branson Barrel etcher 1 kW, 1.25 Torr O2 giving a rate of 50–300 nm/min). A PlasmaTherm parallel plate reactive ion etcher is now used to etch the quartz for forming constrictions 12. The following parameters can be used during etching: Gas flows are 50 sccm, CHF3 and 2 sccm O2. The power density is 100W over a 250 $cm^2$ area. The pressure is 40 mTorr. The etch time is 33 minutes resulting in an etch depth of 1.1 μm as determined by a Tencor AlphaStep 200 Surface Profilometer. Other fabrication techniques that can be used to form device 10 include embossing techniques. In this technique a negative master is created such as by using photolithography as described above. A plastic mold is fabricated by injecting molten plastic into a chamber of which one of the walls consists of the master. The resulting device is thus made in plastic. Another fabrication technique is imprinting in which a master is first made using UV or electron beam lithography. The device wafer is covered with resist such as polymethylmethacrylate (PMMA). To transfer the pattern, the master is pushed against the device wafer at a high pressure, thereby thinning the PMMA at specified locations. The residual PMMA is removed by a brief oxygen plasma etch. It could also be used as a hard mask for subsequent etching of the device wafer. For shallow etching resist could be used as an etch mask. To obtain deep etched structures the Bosch process can be used in an inductively coupled plasma(ICP) on a silicon wafer using e.g. a SSL770 ICP from PlasmaTherm. In this way high-aspect ratio (1:40) structures can be defined with etch depths exceeding 100 μm. To make the device electrically insulating the etch step is followed by a thermal oxidation step.

Figure 2:
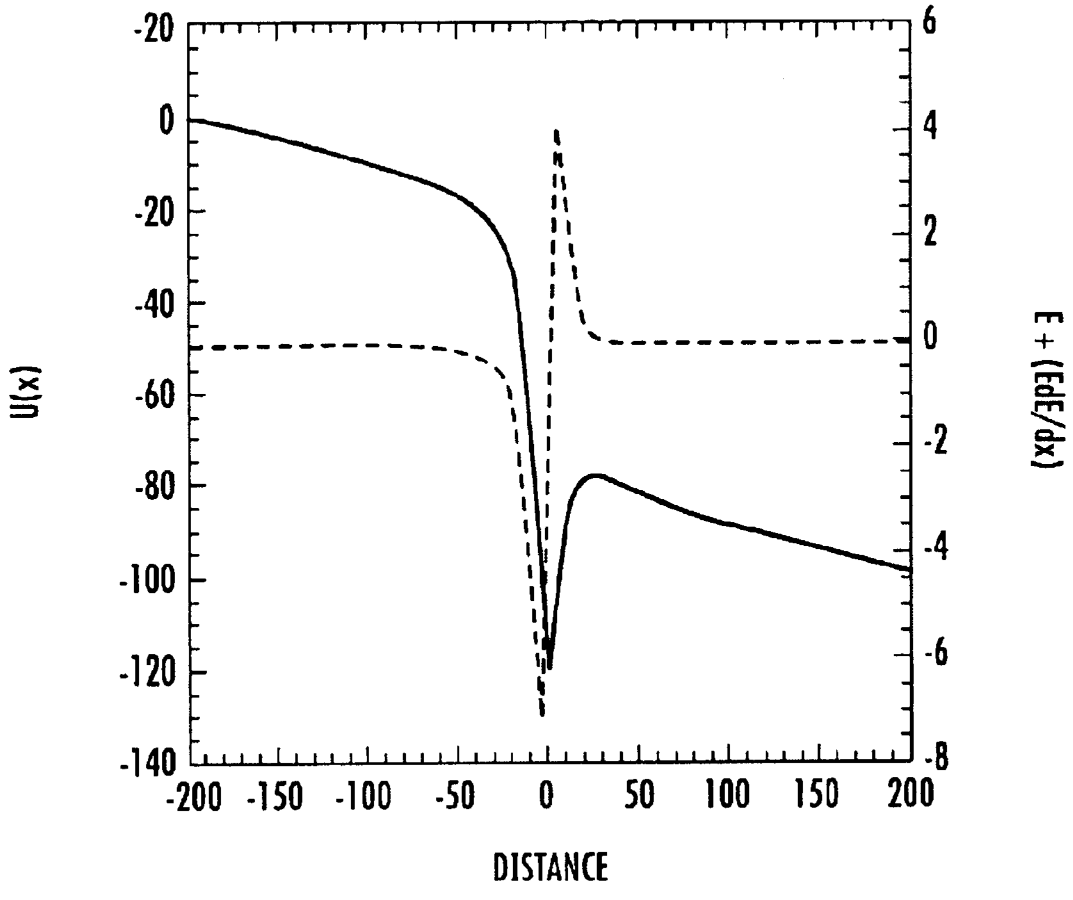
FIG. 2 is a plot of the total force that a polarizable particle experiences while passing through a gradient trap and potential U(x) surface that the polarizable particle moves along.

FIG. 2 shows the forces, electrophoretic and dielectrophoretic, and potential surfaces that charged, polarizable particles experience going through distance $D_1$ between constriction 12 of microfluidic device 10, as shown in FIG. 1A. The forces are represented in dashed lines and the potential $U_{(x)}$ surface that the particles move along is shown in solid line. It is shown that the nonlinear dielectrophoretic component to the forces gives rise to a short-ranged trapping potential. If the field direction is switched, the electrophoretic potential surface will slope in the opposite way while the dielectrophoretic potential is invariant to the sign of the field, so that only the dielectrophoretic component of the force serves as a trap.

Figure 3A:
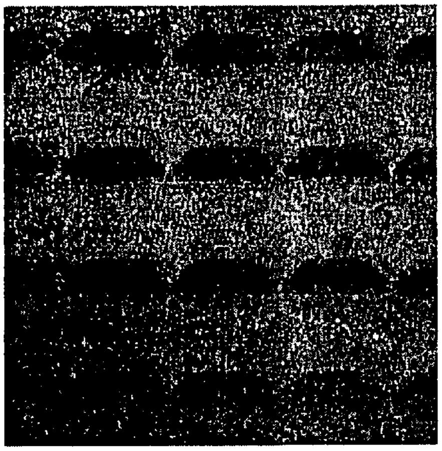
FIGS. 3A–3D illustrates optical micrographs of DEP trapping of 368 bp DNA driving frequency 1000 HZ with respective applied frequencies of 200, 400, 800 and 1000 VP-p/cm.

FIGS. 3A–3D illustrate the use of microfluidic device 10 to trap and concentrate a 368 bp DNA sample at 1000 Hz at various applied fields. Device 10 is hermetically sealed by a glass cover 20 coated with silicone elestomer (RTV 165, General Electric, NY). Both the coated cover 20 and device 10 are pretreated with oxygen plasma to make the surfaces hydrophilic. Device 10 is sealed with cover 20 and then wetted with buffer solutions (pH 8.0, 0.5× TBE, 0.1M DTT, and 0.1% POP-6) by capillary action. By applying an oscillating electric field to the device, DNA molecules were trapped at the constrictions 12. The frame size is 80×80 microns. DNA was stained with TOTO-1 Molecular Probes, Eugene, Oreg. (1 dye/5 bp). The images were taken with a Nikon microphot-SA microscope using an oil immersion objectives lens (60×, N.A.1.4,), a cooled CCD camera (Hamamatsu, Bridgewater, N.J.), and excitation at 488 nm of an Ar—Kr ion laser. The images of FIGS. 3A–3D were each averaged over 3 consecutive frames started with the first one taken 1 minute after the AC electric field parameters were changed, and 1 minute interval for each following images. Each frame was exposed 10 seconds and the light source was shut off when the camera shutter was closed to reduce photo bleaching. In general, the equilibrium is reached in a few seconds after the field is switched on. FIG. 3A illustrates the sample after application of an applied field at 200 Vp-p/cm. Light regions are shown between respective rows 13*a*–13*c* of constrictions 12 indicating concentration of the DNA sample between rows 13*a*–13*c* of constrictions 12.

Figure 3B:
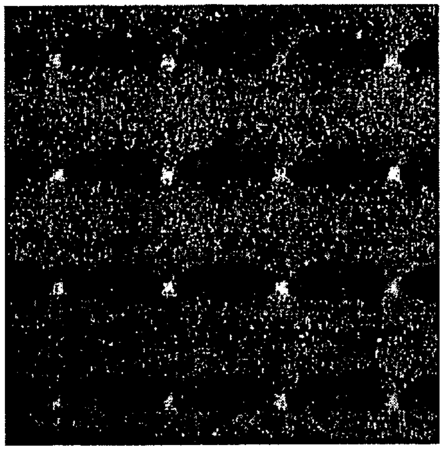

FIG. 3B illustrates trapping of the DNA sample after application of an applied field of 400 Vp-p/cm. Small light regions appear between constrictions 12 and darker regions appear between rows 13*a*–13*c* of constrictions 12 than in FIG. 3A illustrating trapping of the DNA sample between constrictions 12.

Figure 3C:
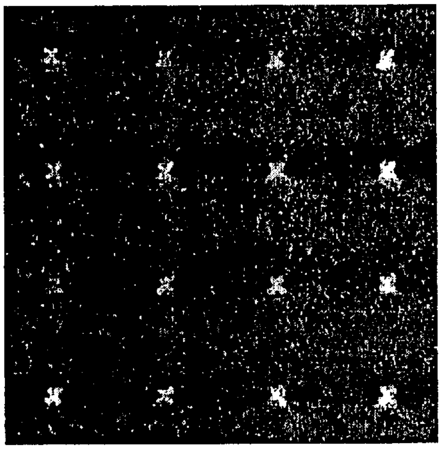
Figure 3D:
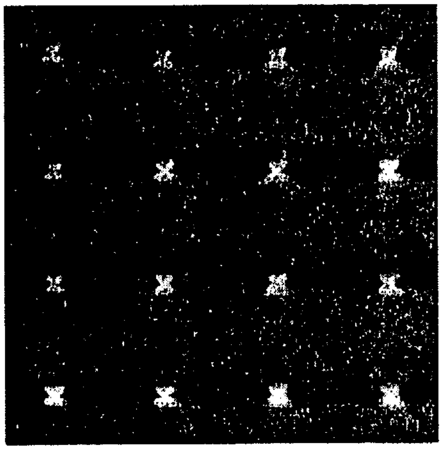

FIG. 3C illustrates trapping of the DNA sample after application of an applied field of 800 Vp-p/cm. Greater intensity light regions appear between constrictions 12 and darker regions appear between rows 13*a*–13*c* of constrictions 12 than in FIG. 3B illustrating greater trapping of the DNA sample between constrictions 12. FIG. 3D illustrates trapping of the DNA sample after application of an applied field of 1000 Vp-p/cm. greater intensity light regions appear between constrictions 12 and darker regions appear between constrictions 12 than in FIG. 3C illustrating greater trapping of DNA between constrictions 12. FIGS. 3A–3D respectively correspond to 1, 2, 4 and 5 Vp-p across each unit cell.

Figure 4A:
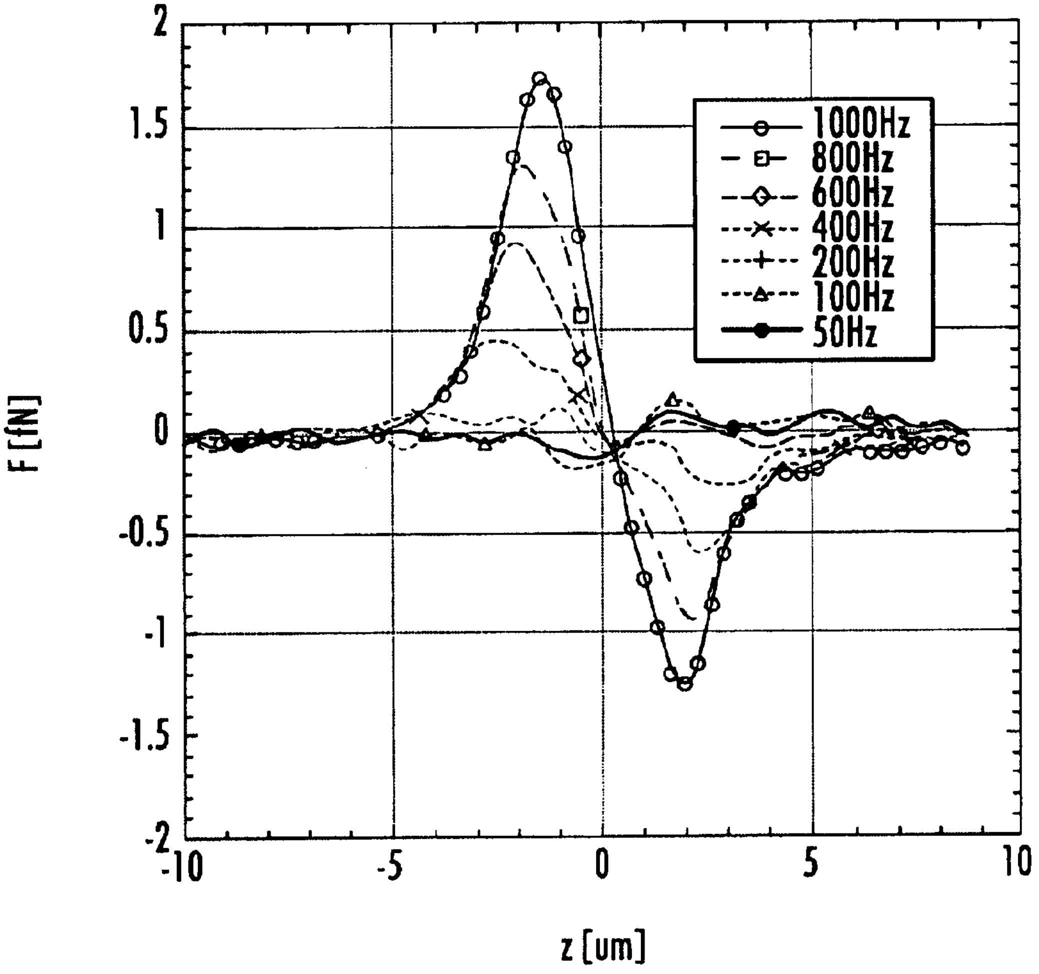
FIG. 4A is a DEP force response curve for 368 bp DNA as a function of frequency.

FIG. 4A shows results of a force analysis based on a fixed field strength of 1 kV RMS across a 1 cm long sealed device 10 as a function of frequency. It was found that determination of the DEP force is independent of $n_0$ provided a dilute DNA solution is used in which the intermolecular interaction is negligible across the unit cell of the device. The force is determined in absolute units, femptonewtons (fN), since kT is determined and the length scale is determined by Eq. 10. To determine a more accurate DNA distribution, the constant background due to the ambient light and the dark current of the water-cooled CCD camera was subtracted. The results show that the force reaches an extreme value not at the position of the strongest field (the center of the gap) but rather where the product of EdE/dz is maximized. FIG. 4 also shows the force is a strong function of frequency and rises monotonically with frequency. The maximum frequency at which the DEP response peaks for 386 bp in water, however, longer lengths of DNA do show peaks in the trapping response with frequency.

Figure 4B:
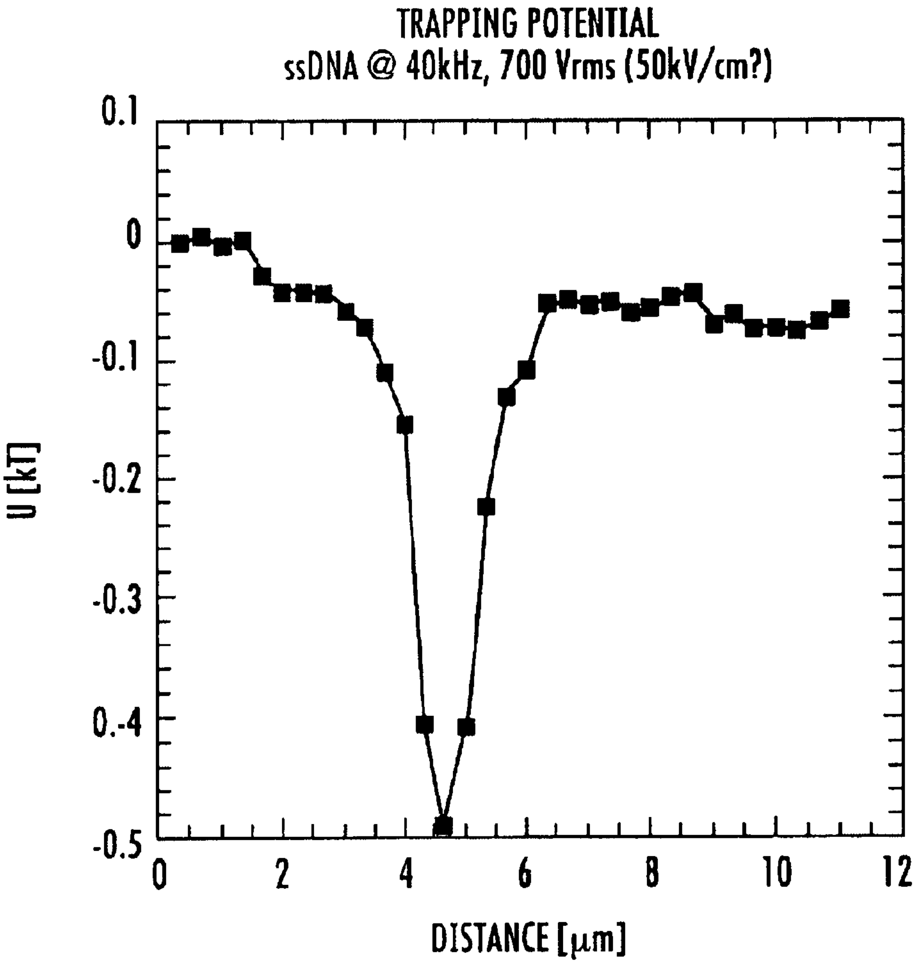
FIG. 4B is a plot of the trapping potential of single stranded DNA while passing through a gradient trap.
Figure 4C:
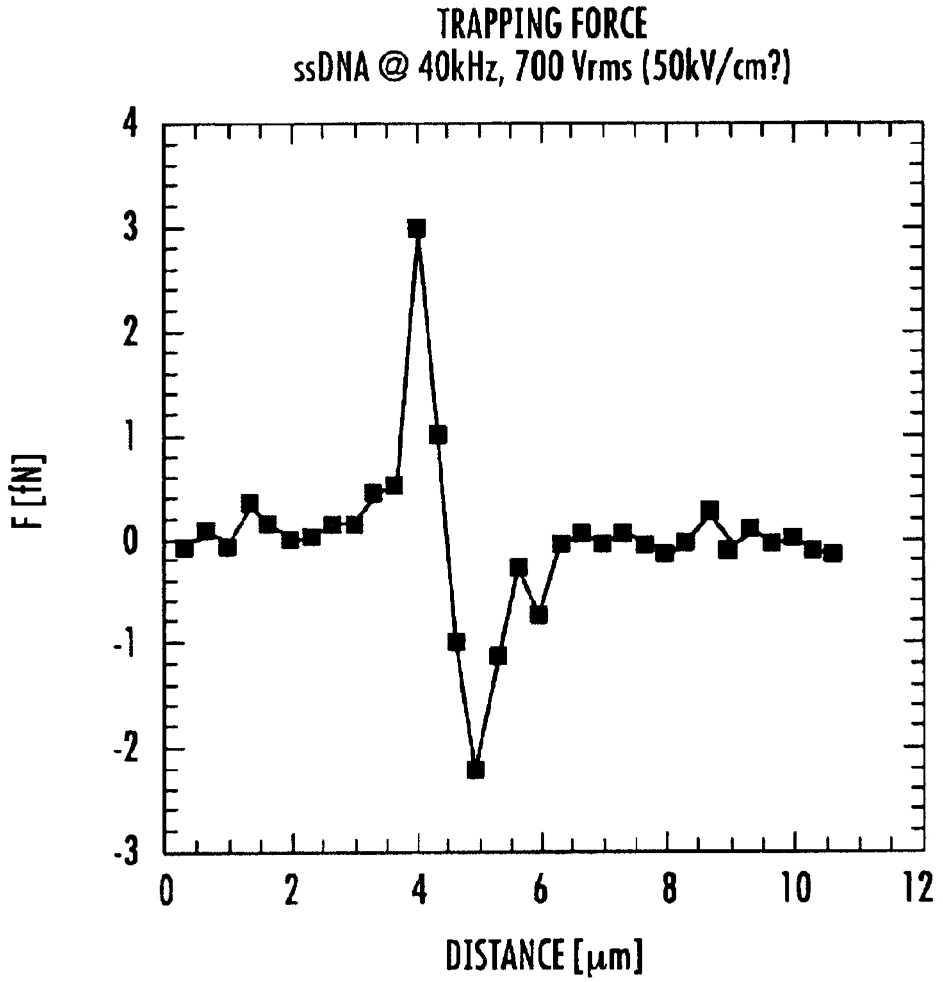
FIG. 4C is a plot of the trapping applied for single stranded DNA.

FIG. 4B shows results of trapping potential for single stranded DNA at 40 kHZ and 700 Vrms (50 kV/cm). FIG. 4C shows results of trapping force for single stranded DNA at 40 kHz and 700 Vrms, 50 kV/cm.

Figure 5:
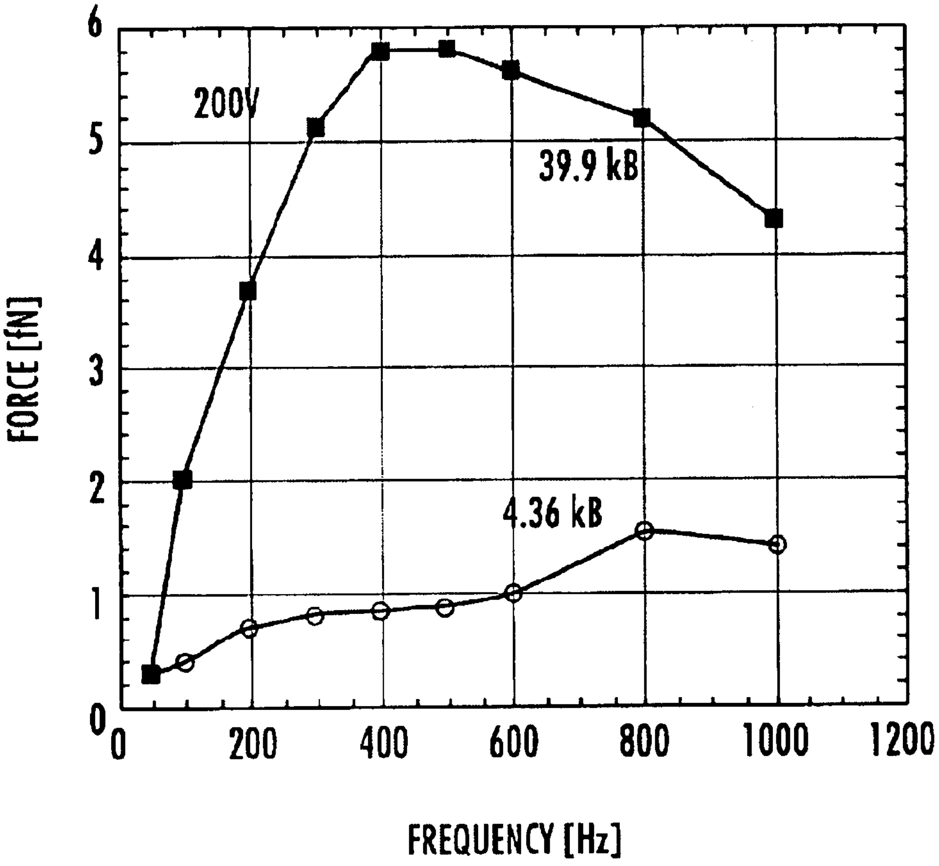
FIG. 5 is a plot of peak forces as a function of frequency for 4361 bp DNA and 39.9 kbp DNA.

FIG. 5 is a plot of peak forces as a function of frequency for 4361 bp DNA and 39.9 kbp DNA at a driving voltage of 200 V. A maximum response for the 4361 bp DNA appears at a force of 1.5 fN and a very clear maximum response for 39.9 kbp DNA appears at a force check 5.8 fN. Accordingly, there is great dispersion in the force with both length and size such that by appropriate choice of parameters one range of DNA molecules could selectively be trapped and another range of DNA molecules could be removed. DNA can be focused to a concentration many times higher than the loading concentration at the constrictions. DEP can be used to accelerate DNA annealing by increasing the concentration locally. For example, if 10 T7 phage DNA are trapped at a constriction with volume of 1 $\mu m^3$, the estimated concentration is 200 $\mu$g/ml, which is ×100 the loading concentration, 0.2 $\mu$g/ml.

Figure 6:
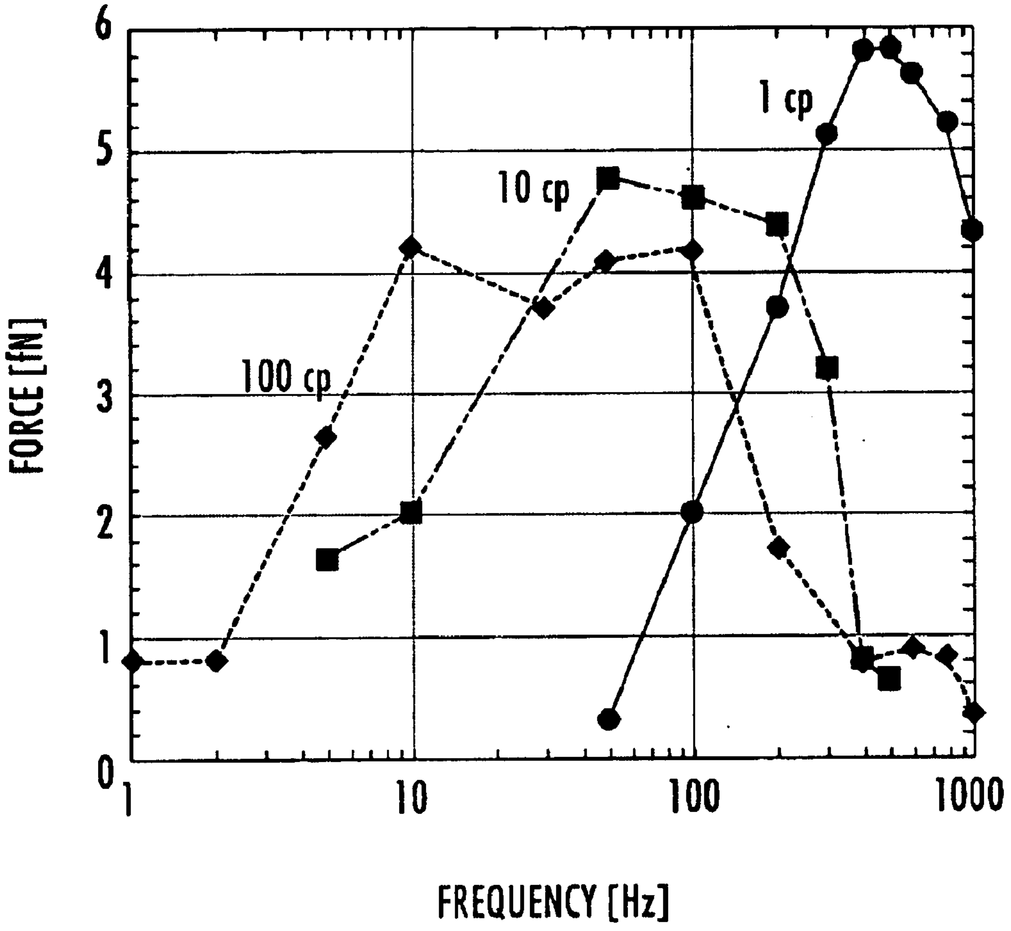
FIG. 6 is a plot of the peak DEP force with varying viscosity for T7 phage DNA (39.9 k bp).

FIG. 6 is a plot for T7 phage DNA (39.9 kB). It shows the origin of the peak in DEP force with frequency by varying the viscosity of the medium. The peak in frequency response is shown to be a function of the viscosity of the fluid. The viscosity was changed by adding known amounts of sucrose to maintain solvent dielectric resonse close to that of water. The buffer viscosity of 1, 10, and 100 cp correspond to 0, 46, and 62.5% (w/v) sucrose respectively. The peak of DEP force shifts down to the low frequency side as the buffer viscosity increases.

Figure 7:
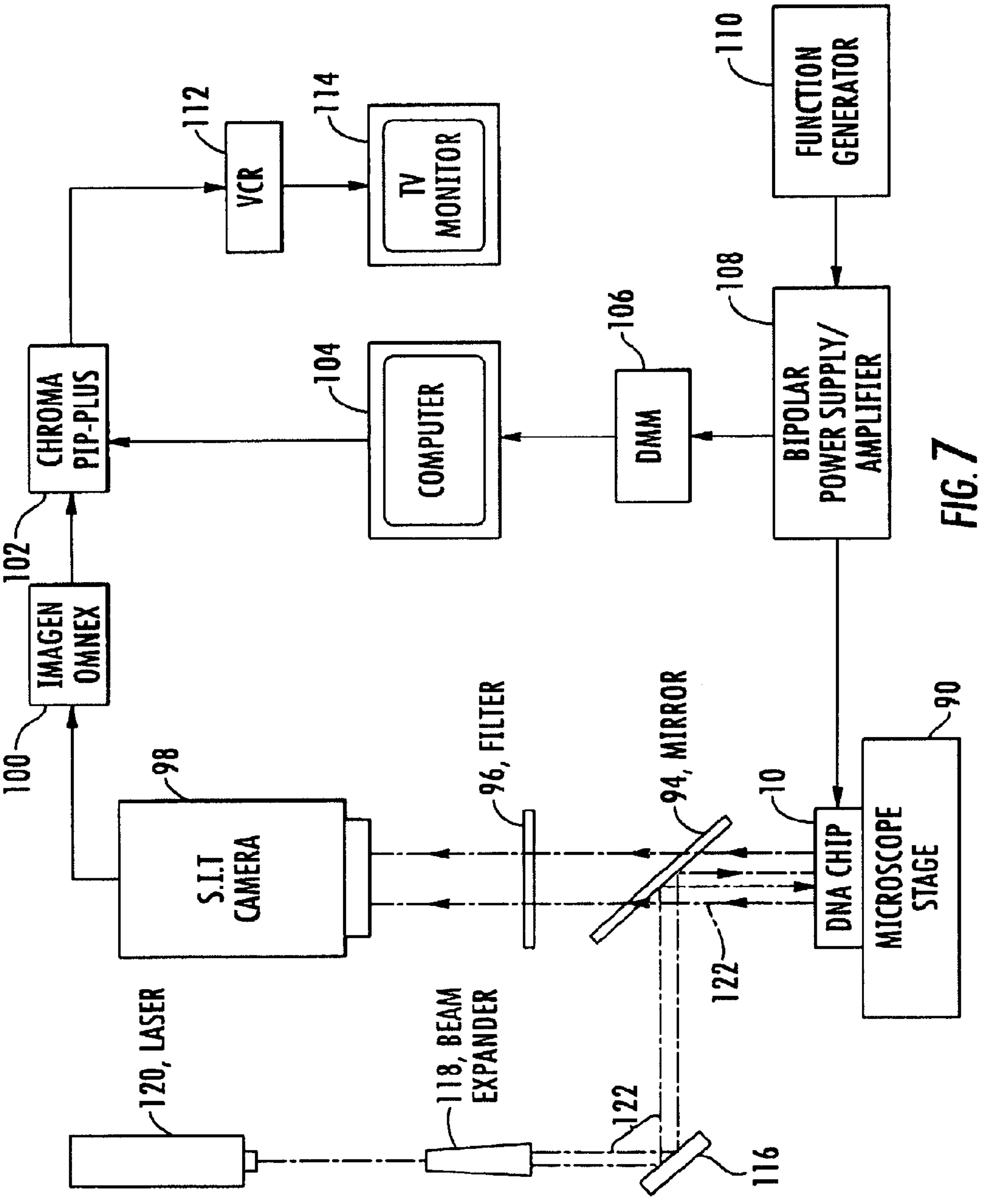
FIG. 7 is a schematic diagram of an experimental set up for operating and monitoring the device.

In FIG. 7, and experimental setup as used in the examples is depicted. Device 10 rests on a microscope stage 90. A laser beam with a wavelength of 488 nm is emitted from an Ar+–laser 120 and is passed through a beam expander 118 and reflected off mirror 116 and dichroic mirror 94 to the device 10. Reflections of this light pass back through the dichroic mirror 94 and through a 500–560 nm band-pass filter 96 where they are captured by a silicone intensified target (S.I.T.) camera 98. The image is then transferred to a n image processor 100. (Imagen Omnex) and into a Picture-in-Picture display device 102 (Chroma PIP-Plus). The current at the supply/amplifier 108 (KEPCO BOP 100M). Information from the electronic circuit passes from power supply/amplifier 108, through a digital multimeter 106 (HP34401A) and computer 104 (IEEE488 with Lab View readout of frequency, Vac, and Vdc) and into the Chroma PIP-Plus 102. The signal goes out of the Chroma PIP-Plus to a VCR 112 An TV monitor 114. Many of these components would be unnecessary in a commercial design, for example, the camera, the microscope, and the laser, for example using near field optical techniques and light emitting diodes, wavelengths or other chip-integrated systems.

Methods of Use

The devices of the present invention are used in the purification, concentration, and launching of particles or molecules in fractionating devices, or in chemical/amplification/detection devices. More specifically, the devices are useful for the purification of polymerase chain reaction ("PCR") products or the initial "clean-up" of the PCR reaction.

The devices of the present invention are placed in an appropriate chamber such that the dielectric field regulated by switch controller 27 is applied across the rows 13*a*, 13*b*, 13*c* at the appropriate voltage V using for example Pt electrodes.

The methods of using the present invention are set forth below in greater detail. The following examples are presented for purposes of illustration only and are not intended to limit the scope of the invention in any way.

1) Concentration of Polarizable Particles or Molecules

In analytical and preparative applications of the device polarizable molecules as defined earlier can be concentrated in the DEP traps. The solution containing said molecules is pumped or otherwise transported between gaps 11 whilst an appropriate DEP field is applied to the device. The DEP frequency is chosen by those familiar with the art so that only those molecules of a particular size are trapped between constrictions 12. The quantity of polarizable molecule at constrictions 12 can then be estimated by a variety of procedures, including but not limited to staining with the appropriate fluorescent dye specific for the molecule to be estimated, and added to the solution before DEP tracking. This is the embodiment shown in FIG. 3.

In more particular embodiments, a microfluidic device of the present invention is sealed as described above and wetted with a sample solution comprising polarizable particles or molecules. By applying a voltage across the device dielectrophoretic traps are formed at the constrictions in the device. To fill the traps the sample particles or molecules are continuously pushed forward. This can be realized in many ways:

In one embodiment of the present invention, the particles or molecules are concentrated by applying an AC field across the device that will form the trap and use a DC field to feed the sample into the traps. This method requires that the sample has (a net charge and) a non-zero electrophoretic mobility.

In another embodiment, the particles or molecules are concentrated by using an AC field to form the trap and create a flow in the liquid sample by an applied pressure or using a syringe pump for feeding the sample into the traps. This method does not require charged sample particles or molecules. The electrophoretic mobility can be zero.

In yet another embodiment, the particles or molecules are concentrated by using a DC field for trapping . The electrophoretic force dominates for small DC fields, but the dielectrophoretic force can dominate for sufficiently large fields. To compensate and adjust the electrophoretic movement the fluid can be moved by an applied positive or negative pressure or by using a syringe pump.

In another embodiment the molecules are proteins that are concentrated to small areas for analysis. The concentrations of proteins extracted from cells are expected to be very dilute. To increase the signal to noise ratio in the analysis of these proteins they must be concentrated. The purpose can be to study the interaction of the protein expression with the extracellular environment.

2)Concentration of Molecules in Gene Chip Arrays

Another utility of the present invention is to use the microfluidic devices to concentrate polynucleotides or proteins such as antibodies to positions on silicon or glass chips (also referred to as "gene chips" or "protein chips") to improve sensitivity. In this embodiment the samples are first dispensed in solution through channels 22 then concentrated in situ by DEP and detected by, for example, fluorescence. For example, for very dilute solutions of samples, the molecules of interest may be difficult to detect by standard methods due to electronic noise and background fluorescence. Detection of hybridization to the gene chip will be improved by concentrating the polynucleotide molecules to a smaller area by DEP and using a point detector, such as a photomultiplier tube, to detect a fluorescent signal. This embodiment combines the trapping phenomenon shown in FIG. 3 with a sensitive detector.

In one embodiment of the invention, the molecule is concentrated into constrictions of the microfluidic devices. The initial sample is dielectrophoreticly trapped to create an area of high concentration of probe molecules. For fluorescence detection this contributes to a higher signal to noise ratio. It makes it possible to work with lower concentration of probes. During hybridization the rate depends on the concentration of the hybridizing species. Higher concentrations yield faster rates.

In another embodiment, the probe for detecting the sample is concentrated at the constrictions of the microfluidic devices to enhance detection of the sample on the chip. For very dilute solutions of samples, the fluorescently labeled molecules of interest may be difficult to detect due to electronic noise and background fluorescence. Detection of hybridization to the gene chip will be improved by concentrating the polynucleotide molecules to a small area. Using a CCD detector the noise comes from the readout noise of the CCD as well as the background fluorescence from the device and the sample solution. By concentrating the sample to small areas the local signal to noise ratio is increased in these areas.

One example of the procedure is outlined as follows. Probe molecules are concentrated to spots using dielectrophoretic trapping and chemically bound to the surface. In order to bind a wide range to different probe molecules selective light induced binding is utilized. One type of probe molecule is introduced into the chip, concentrated to the constrictions and bound to one site using a light pulse focused to that particular site. The probe molecules are washed out and a solution with another probe molecule is introduced concentrated and bound to another site as above. The procedure is repeated for the desired number of probe molecules. In this way a gene chip is created. Sample molecules are end-labeled with a fluorescent label. The sample solution is introduced into the chip and concentrated dielectrophoreticly at each constriction. Some examples of concentration procedures are describes above under section 1. The concentration of the sample at the target sites ensures a fast hybridization and it also allows for an analysis of a low-concentration sample.

3) Acceleration of Polynucleotide Hybridization Rates

Nucleic acid hybridizations are important in diagnostics and for the characterization of molecules. The term "nucleic acid hybridization" is meant to include hybridization reactions between all natural and synthetic forms and derivative of nucleic acids, including deoxyribonucleic acids (DNA), ribonucleic acids (RNA), polynucleotides and oligonucleotides, peptide nucleic acids, etc.

The rate of polynucleotide hybridizations can be accelerated by either a) concentrating single stranded DNA molecules near a constriction or b) using the self-attraction of the induced polarization of the molecules. Hybridization of complementary strands of DNA is a very concentration dependent process. If the concentration is too low the probability that two complementary strands come close to each other is very small and thus the hybridization time is very long. For hybridization reactions that are used for diagnostic purposes (see for example, the fluorescent beacon probes of Tyagi, S. and Kramer, F. R. (1996) Nature Biotechnol., 14, 303–308, the enhanced concentration and for the light-up probes: ref "Light-up probes: thiazole orange-conjugated peptide nucleic acid for detection of target nucleic acid in homogeneous solution.", Svanvik-N; Westman-G; Wang-D; Kubista-M; Analytical-biochemistry; vol 281, number 1, 26–35, year 2000) makes analysis of very dilute samples possible within reasonable time. For example, samples containing as little as 1 fg/ml can be concentrated in the device by more than 12 orders of magnitude in less than 60 secs.

In particular, the rate of hybridization of polynucleotide sequences can be accelerated using the device and methods of the present invention as follows. A dilute sample containing 1 fg- 1 ng/ml of poly- or oligonucleotide can be concentrated to $\mu$g/ml in gap 11 where hybridization can be carried out by raising the temperature of gap 11 and allowing the nucleic acids to anneal by lowing the temperature below the melting point. This procedure can be carried out in a few seconds. At 1 fg/ml the annealing time is essentially infinite by comparison. As before the annealed product is detected by for example a fluorescent dye specific for double stranded DNA. In other embodiments, single and double stranded nucleases can be added to distinguish between ss and dsDNA. Temperature control is by a heating and cooling element, such as a Peltier cell, either under the chip or fabricated below each constriction 12. The dilute polynucleotides are concentrated by applying a small e.g. 10V/cm Direct Current (DC) voltage that brings in the sample from a port fabricated above each constriction 11. Alternatively, the dilute polynucleotide sample can be brought into the device by using hydrodynaimc flow produced by a small pump capable of very low flow rates e.g. $\mu$l/min, or by e.g. the wicking action produced by adding a concentrated buffer solution at one end of the device. Then a large AC voltage is applied for trapping the polynucleotide molecules at the constrictions of the insulating material of the microfluidic device. The voltage is chosen by those familiar with the art with reference e.g. FIG. 5, the voltage depending on the molecular mass of the products to be trapped. Trapping times are on the order of seconds to minutes, depending on the chosen voltage, the size of the nucleic acid sample, and the buffer used.

4) Fractionation of Particles or Molecules

The devices of the present invention are useful in the fractionation of differently sized particles or molecules in a solution, in particular, DNA molecules. The dielectrophoretic force depends on the dielectric properties of the particle or molecule, and it depends on the strength and the phase of the induced dipole moment. A strong dipole moment results in a strong force. When the dipole is in phase with the local electric field the force will be attractive, whereas if the dipole is out of phase, there will be negative dielectrophoresis and a repulsive force.

Takashima ((1989) Electrical Properties of Biopolymers and Membranes, IOP, Philadelphia, Pa.) demonstrated that there is a strong correlation between the length of the DNA molecule and the dielectric constant. The present application demonstrates that the frequency that gives the peak or maximum force is a function of the length of the DNA molecule, and that this principle applies as well to single stranded DNA samples. Therefore, a mixture of differently sized particles or molecules, such as DNA, can be separated by applying different frequencies. By applying an appropriate frequency, the drift velocity of the DNA in the structure can be made a function of the length of the DNA.

Figure 8:
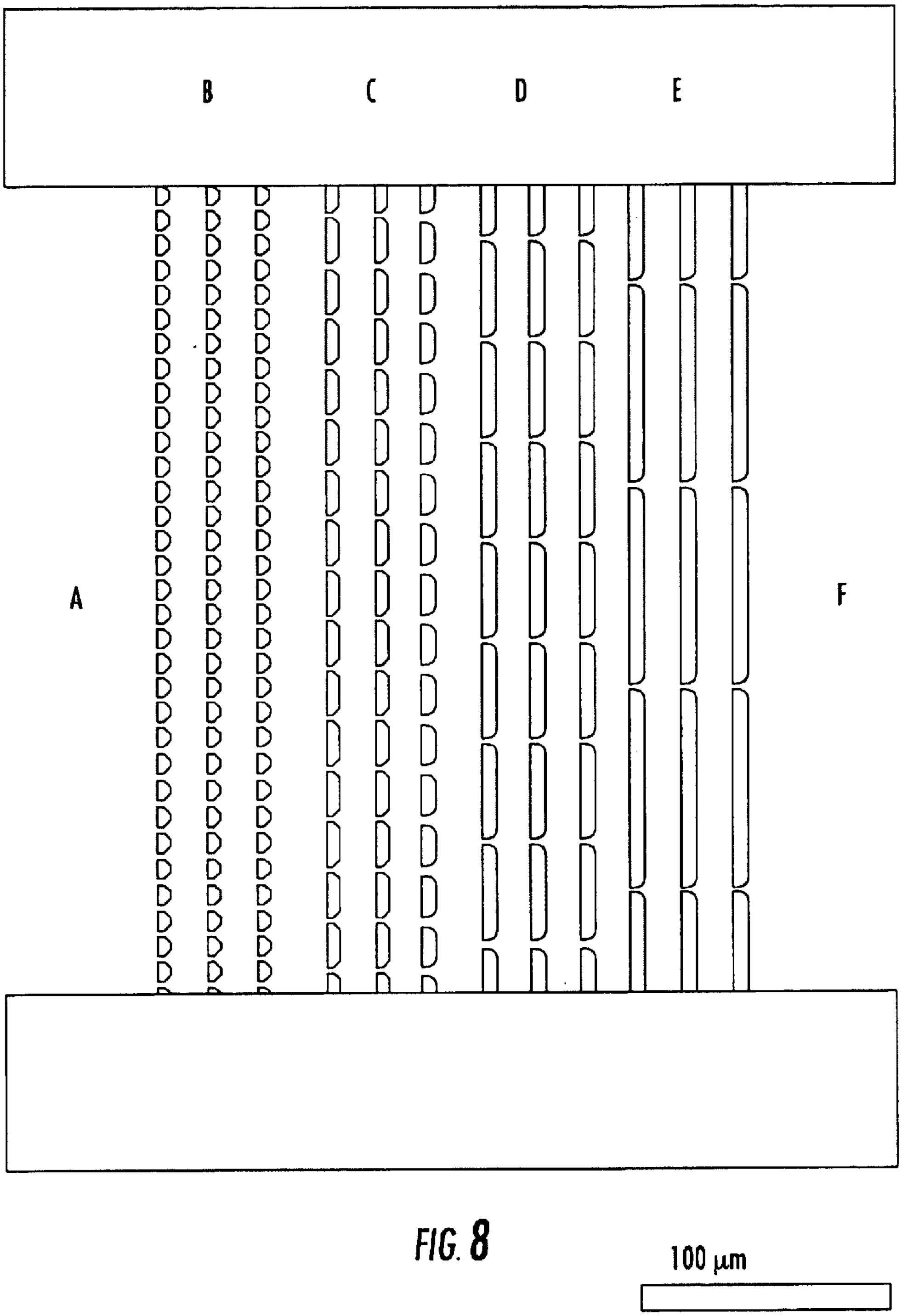
FIG. 8 is an embodiment of the device including an array of constrictions.

An example of using the present invention to separate differently sized particles or molecules is as follows. A mixture of differently sized particles or molecules is added to the microfluidic device using a pipette or other similar means. The appropriate AC field (with reference to but not restricted by FIGS. 4 and 5) is applied across the electrodes shown in FIG. 1C and it is then varied as solvent if flowed across the plane of the device. The largest molecules are trapped at the lowest frequencies (FIG. 5) and the smallest at the highest. Thus in one embodiment at the beginning of the experiment the device is pulsed at the highest frequencies, where all of the molecules are trapped. The DEP frequency is then systematically lowered and an imposed DC bias added. The smallest molecules then electrophorese out of the traps 11, followed by the next smallest as the frequency drops; and so on, until all of the trapped molecules have been electrophoresed out of each trap, either into connecting micro machined channels connected to each trap (a micropreparative mode), or into the bulk solution surrounding each trap (the analytical mode). As before, the concentration of material in 11 is monitored by e.g. fluorescence. Three additional approaches are presented as examples:

The device is organized as an array of constrictions in regions (B)–(C) in a major microfluidic channel (A), as shown in FIG. 8. The constrictions are made increasingly sparser from the point of sample input (A) to the end of the major microfluidic channel (F). The trapping force thus becomes increasingly larger as the sample moves along the major microfluidic channel. At first large easily trapped molecules are trapped. In another embodiment perpendicular to the major microfluidic channel (A) there are minor channels 131–141 that are used for harvesting the fractionated samples.

(1) In one embodiment, the trapping energy is proportional to the dipole moment. This results in longer molecules being trapped with a larger probability than smaller ones. In a device with an uniform array of constrictions the longer molecules will therefore travel slower than the smaller molecules. Load the device as outlined above by applying a drop to the end of the sealed microfluidic channel or by injection. Introduce the sample into the device by a DC field or a hydrodynamic flow and apply an AC field to trap the DNA. Apply a sufficiently low AC so that the molecules are not strongly trapped, but only retarded according to size.

Figure 9:
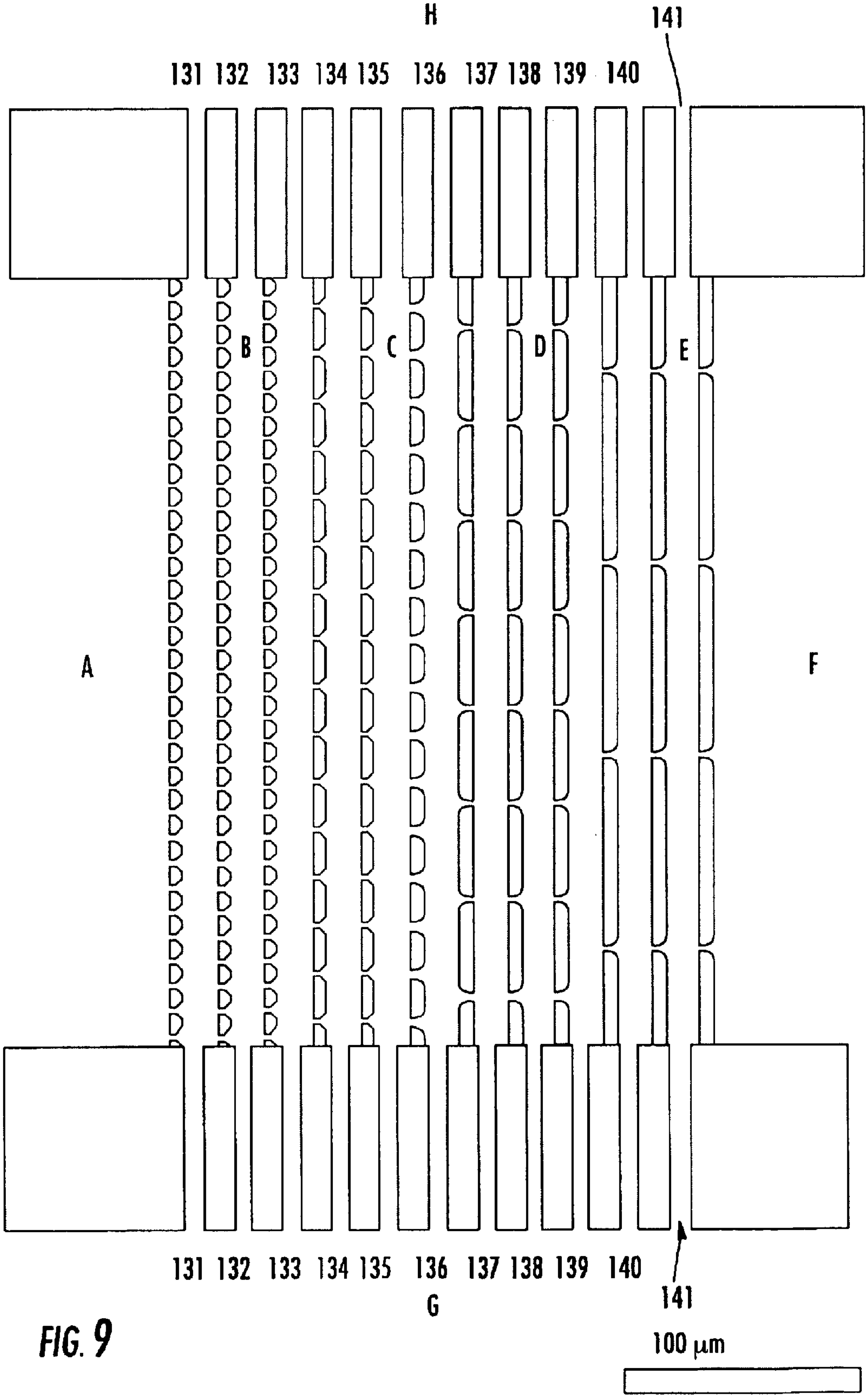
FIG. 9 is an embodiment of the device including an array of constrictions and channels.

(2) In another embodiment, the device consists of an array of constrictions that are increasingly far separated from each other laterally (see FIGS. 8 and 9). The electric field strength and thus the trapping force increases along the channel. Essentially, molecules with a trapping energy>>kT will be trapped and the molecules with a trapping energy<<kT will pass through. The result is that longer DNA are trapped early in the channel where the trapping energy is sufficient only for the long molecules, whereas the smaller molecules are trapped towards the end of the channel, where the electric field is larger. The result is a series of bands (just as in a gel) corresponding to the different sizes of DNA. As shown in FIGS. 8 and 9, device 10 has tightly grouped bands at one end (B) and fewer widely spaced constrictions at the other end (E) and intermediate spacing between (C)–(D). For example, tightly group bands (A) can be 16, 32, or 64 times more than the bands of (D). It is important to load the device with DNA from the low-electric field side (A), where the constrictions are tightly grouped together as shown in FIGS. 8 and 9. Otherwise essentially all the molecules will be trapped in the first row of constrictions. The detection is enhanced by the confinement of the DNA in the constrictions. By adding channels 131–141 perpendicular to the main channel the separated DNA can be harvested. Load the device as outlined above by applying a drop to the end of the sealed microfluidic channel or by injection. Introduce the sample into the device by a DC field or a hydrodynamic flow and apply an AC field to trap the DNA. Also the field creates a flow of the sample molecules by applying a pressure gradient or by applying a DC field if the molecules have a net charge.

More particularly, the procedure would be to introduce DNA by applying a DC field or a hydrodynamic flow and trap the DNA using an AC field. The AC field must be carefully tuned. Too strong an AC field would trap all DNA in the first row (B). Too weak an AC field would allow some DNA to escape at the end (F). The AC field should be chosen so that the DNA sample is spread out over the entire device, largest DNA is trapped in the first row of constrictions (A) and the smallest DNA is collected in the last row (E) of constrictions.

(3) The third embodiment is an extension of approach (2). The loading and trapping of the device is carried out according to what is outlined above under approach (2). The device is modified so that a flow of molecules perpendicular to the flow as described in (2) is made possible.

The present application demonstrates that the frequency that gives the peak force or and the maximum force itself is a function of the length of the DNA molecule. Therefore, a mixture of differently sized particles or molecules, such as DNA, can be separated by applying different frequencies. Generally for smaller molecules, a higher frequency and a higher voltage is required for trapping. The applied frequency and voltage determines the lower limit of the length of the trapped DNA molecules. By applying an appropriate frequency, the drift velocity of the DNA in the structure can be made a function of the length of the DNA.

5) Improving PCR Performance and Purification of PCR Reaction Products

The Polymerase Chain Reaction (PCR) is a powerful tool used in diagnostics and the analysis of polynucleotides. PCR consists of three steps: melting a double-stranded polynucleotide, annealing a primer to the target polynucleotide, and elongation of the PCR product polynucleotide. For example, during a typical PCR reaction, during the melting step the double-stranded DNA is transformed into single-stranded DNA by heating to 90° C.; the annealing of the primers to the single-stranded DNA is performed at 55° C. and the elongation step occurs at 70° C.–72 ° C.

Using the microfluidic dielectrophoresis devices of the present invention provide a number of advantages over conventional PCR reactions performed in a thermocycler. First, the devices improve the rate of the hybridization step. The annealing or hybridization step is dependent upon the concentration of the polynucleotides and primers. The rate of annealing is improved using the dielectrophoresis devices of the present invention because the concentration of the polynucleotides and primers can be increased several orders of magnitude.

Second, the devices of the present invention permits samples of very low concentrations of template. In conventional PCR single molecule conditions are possible but require great experience. In the proposed device single molecules will be trapped in a very small volume (~1 $\mu m^3$) along with the primers and templates, thereby increasing the local concentrations many orders of magnitude over conventional devices and thus favoring successive annealing steps for the reasons discussed above.

Third, the devices of the present invention permit the purification and isolation of the PCR reaction products. For example, after completion of the PCR amplification reaction, the products can be separated from the residual nucleotides (dNTPs), primers, and enzymes. Under suitable conditions, the PCR products are purified by trapping the primers in the constrictions of the device and flushing the residues either by a hydrodynamic flow or an applied DC field. The device can be incorporated into a separation device e.g a capillary or slab DNA sequencer, and used for cycle sequencing. In this embodiment the device serves as a thermocycler in the first step of the procedure, as a clean up step in the second, and as a zone concentrator just prior to launching the sequencing reaction into the capillary bed at the third step.

An example of a PCR reaction performed using the devices of the invention is performed as follows. The PCR reaction mix is introduced into the device through a port positioned over or connected to constriction 12. Device 10 is mounted on a controlled heating and cooling platform e.g. a Peltier cell or other appropriate heating and cooling source, the reaction precursors and products are trapped by DEP, and the thermocycling steps carried out. The reaction is followed by monitoring the fluorescence of the PCR product as it accumulates in gap 11 . A suitable fluorescence dye for this is Syber Green, which does not inhibit the PCR reaction. At the appropriate time e.g. when the Syber Green signal has reached a level appropriate to the sensitivity of the sequencer, the PCR product is trapped and cleaned up in the DEP field as described above, and then injected into the sequencer by applying a DC bias to the DEP field.

A single PCR cycle for a template of a few hundred base pairs will take several seconds in the device because the heat content of the 1 $\mu m^3$ volume of 11 is essentially zero and thus each cycle requires a very short heating and cooling time (~1 sec). In the proposed embodiment other forms of cycle sequencing can also be used, including but not limited to the ligation chain reaction (reviewed in e.g. PCR Methods Appl 1995 June;4(6):337–45A one-step coupled amplification and oligonucleotide ligation procedure for multiplex genetic typing. Eggerding FA), rolling circle amplification (Lizardi PM, Huang X, Zhu Z, Bray-Ward P, Thomas DC, Ward DC. Mutation detection and single-molecule counting using isothermal rolling-circle amplification. Nat Genet. 1998 July;19(3):225–32), and fluorescence polarization (Chen X, Levine L, Kwok PY. Fluorescence polarization in homogeneous nucleic acid analysis. Genome Res. 1999 May;9(5):492–8).

Third, the devices of the present invention permit the purification and isolation of the PCR reaction products. For example, after completion of the PCR amplification reaction, the products can be separated from the residual nucleotides (dNTPs), primers, and enzymes. Under suitable conditions, the PCR products are purified by trapping the primers in the constrictions of the device and flushing the residues either by a hydrodynamic flow or an applied DC field.

EXAMPLE 1

DNA Preparation

A variety of single-stranded and double-stranded DNA has been used, for example: Fluorescein-labeled 50-mers, TOT-1 labeled bacteriophage T4, and HindIII digested λ DNA (Sigma and New England Biolabs). T4 is 167 Kbp long, λ is 48 kbp long, and HindIII digested λ has fragments of 23130, 9416, 6557, 4361, 2322, 2027, 564 and 125 bp. All DNA solutions were diluted to 0.25 $\mu$g/ml with 0.1 DTT (a reducing agent), 5M TOTO-1 dye, 0.1% POP-6 (Perkin-Elmer), an electrosmosis suppressing agent, and 1/2×TBE buffer (5×: 54 g Tris base, liter) DNA was pipetted onto one end of the open channel of the sealed device and capillary action was used to wet the channel with DNA.

EXAMPLE 2

Discrete regions of DNA or RNA by reverse transcriptase PCR can be amplified directly at the constrictions by thermocycling (PCR). A typical PCR reaction mixture contains buffer, thermostable DNA polymerase, template DNA (as little as single molecule), and appropriate pairs of oligoneucleotide primers (see, for example, Saiki R K, Glefnad D H, Stofffel S., Scharf S J, Higuchi R, Horn, G T, Mullis K B, Erlich H A, Aprimer-directed enzymatic amplification of DNA with a thermostable DNA polymerase, see Science 239(4839); 487–91. (1988)). Template, and then reaction product, is trapped by the dielectrophoretic field between the constrictions thermocycling reaction is carried out. The method of detection uses a fluor that fluoresces strongly only when bound to the double stranded DNA product, shows little or no auto fluorescence when not bound to DNA, and does not inhibit the DNA polymerase chain reaction. One such fluor in use in this laboratory is SYBR7 Green-1 (Molecular Probes) added to the PCR reaction mix at a dilution of 1:40,00–1:100,000. Thus only the polymerase chain reaction product is detected.

The brightness of the image reflects the amount of DNA, and brightness is used to gauge when the thermomocycling reaction is over. At that point the product is launched from the constrictions into the appropriate separation matrix for accurate sizing—cross-linked polyacrylamide for low molecular weight samples, linear acrylamide and polyethylene oxides for larger sizes. This technology can be combined with the array technology described in Austin et al., U.S. Pat. No. 5,427,663, so that the thermocycling reaction is integrated into a chip fabricated in such a manner that the reaction products can be launched directly into the separation medium. Other labeling alternatives that depend for their efficacy on the incorporation of reporter groups into the product can also be used, as reviewed in Wittwer C T et al. (1997), "Continuous fluorescence monitoring of rapid cycle DNA amplification," Biotechniques 22(1): 130–138. The method described here are useful for multiplex genotyping, diagnostics, forensics, reverse transcriptase PCR, quantitative PCR and sizing PCR products from a variety of sources. See, for example, Ju et al., (1995), "Fluroescence energy transfer dye-labeled primers for DNA sequencing and analysis," Proc Nat'l Aca Sci USA, 92(10): 4347:53; Glazer et al. (1997), "Energy-transfer fluorescent reagents for DNA analyses," Curr. Opin Biotechnol, 8(1):94–102.

The dye could be used to calibrate parameters for the reaction, and then left out in actual cycling steps, but it is preferable to use the dye as a monitoring tool. Preferred dyes are large groove binding dyes that do not bind to single stranded DNA, have low or no auto florescence, and do not interfere with PCR.

Alternatively, this device can be sued for the amplification scheme called "strand displacement amplification "(Walker, G T PCR Method and Applications 1993 3:1–6). In this method DNA template, buffer, deoxytriphosphates, DNA polymerase, primers and restriction endonuclease are incubated at an elevated temperature and the DNA is amplified linearly by strand displacement. The product is detected as described above prior to launching, fractionation, and detection, or the reaction may be followed by fluorescence polarization (Spears P A, Linn C P, Woodard D L, Walker G T Anal Biochem 1997 247:130–137).

EXAMPLE 3

DNA sequencing is typically carried out using single or double-stranded templates by the linear polymerase chain reaction, so-called "cycle sequencing". Murray (1989), "Improved double-stranded DNA sequencing using linear polymerase chain reaction." Nucl. Acid Res. 17:8889; Craxton (1991), "Linear amplification sequencing: A powerful method for sequencing DNA," Methods: A companion to Method in Enzymology, 3:20–26. In a typical reaction, buffer thermostable DNA polymerase, template, and an oligonucleotide primer specific for only one strand of the template are combined with deoxyribonuceloside triphosphates and their dideoxynucleoside derivatives. The reaction is then subjected to many rounds of thermocycling and the reaction products are separated on a sequencing gel. Slatko (1994), "Thermal cycle dideoxy DNA sequencing," Methods Mol Biol 31:35–45. According to the invention, the entire "cycle sequencing" reaction is carried out on template trapped between the contrictions, and the reaction products are launched directly into a downstream separation matrix, such as a sequencing gel or array as described above. Here, as elsewhere, the dideoxy chain terminators can be labeled with fluorescent dyes so that all 4 bases can be identified (see, for example DNA Sequencing. Chemistry Guide (1995) Perkin Elmer part number 903563).

The embodiments illustrated and discussed in this specification are intended only to teach those skilled in the art the best way known to the inventors to make and use the invention. Nothing in this specification should be considered as limiting the scope of the present invention. Modification and variations of the above-described embodiments of the invention are possible without departing from the invention, as appreciated by those skilled in the art in light of the above teachings. It is therefore to be understood that, within the scope of the claims and their equivalents, the invention may be practiced otherwise as specifically described.

Various publications are cited herein, the disclosures of which are incorporated by reference in their entireties.

We claim:

1. A microfluidic device for trapping polarizable particles comprising:

a substrate bearing a plurality of constrictions, each of said constrictions being separated from one another by a gap having a distance $D_1$ and formed of an insulation material;

means for passing said polarizable particles in the vicinity of said constrictions; and means for applying a dielectrophoric field to said substrate, wherein said polarizable particles are trapped in said gap when said dielectrophoric field is applied by a dielectrophoretic force determined by confining said dielectrophoric field to a smaller cross section in said gap.

2. The device of claim 1 wherein said means for passing particles in the vicinity of said constrictions comprises:

fluid input means for inputting a fluid comprising a concentration of said polarizable particles.

3. The device of claim 2 wherein said fluid input means is a syringe pump.

4. The device of claim 1 wherein said means for applying a dielectrophoric field comprises:

an electrical signal applied to a pair of electrodes positioned on opposite edges of to said substrate.

5. The device of claim 4 wherein said electrical signal is an AC voltage at a predetermined frequency.

6. The device of claim 5 wherein the predetermined frequency is between about 1 Hz and about 1 Ghz.

7. The device of claim 4 wherein said electrical signal is a DC voltage at a predetermined frequency.

8. The device of claim 1 wherein said constrictions are formed on said substrate using a photolithography etch.

9. The device of claim 1 wherein said polarizable particles are selected from the group consisting of single-stranded DNA, double-stranded DNA, RNA, biological cells and polymer particles.

10. The device of claim 1 wherein said distance $D_1$ is in the range of about 0.1 mm to about 300 $\mu$m.

11. The device of claim 1 wherein each of said constrictions have a height in the range of about 0.5 $\mu$m to about 5.0 $\mu$m.

12. The device of claim 1 wherein said distance $D_1$ is about 1 $\mu$m, a height of said constrictions is about 1.25 $\mu$m and said particles are polyonucleotides of DNA or RNA.

13. The device of claim 1 wherein said constrictions are formed in a plurality of rows being separated from one another by a distance $D_2$ wherein said distance $D_2$ is selected to vary an electric field gradient of said electric field.

14. The device of claim 1 wherein said constrictions have a trapezoidal shape with side edges angled from a bottom edge.

15. The device of claim 1 wherein said constrictions are formed of a material selected from quartz and silicon.

16. The device of claim 1 further comprising a cover, said cover being coupled to said substrate with a sealing layer.

17. The device of claim 1 wherein said plurality of constrictions are arranged in regions wherein in a first said region at a first end of said device in a second region said constrictions are arranged in tightly grouped bands and at a second end of said device said constrictions are arranged with fewer widely spaced constrictions.

18. The device of claim 17, further comprising a third region intermediate of said first regions and said second region said third region having intermediate spacing of said constrictions.

19. The device of claim 17, further comprising one or more channels coupled to end of said regions for extracting said polarizable particles from each of said regions.

20. The device of claim 1, further comprising a matrix in a channel downstream from the plurality of constrictions capable of fractioning and/or analyzing the polarizable particles released from the plurality and constrictions.

21. The device of claim 1, further comprising imaging equipment to visualize the polarizable particles.

22. The device of claim 1, wherein the substrate comprises a material selected from the group consisting of SiO2, polymide, p-xylylene, PDMS or PMMA.

23. The device of claim 1, further comprising heating means adjacent said constrictions.

24. A microfluidic device for trapping polarizable particles comprising:

a substrate bearing a plurality of constrictions, each of said constrictions being separated from one another by a gap having a distance $D_1$ and formed of an insulation material;

means for passing said polarizable particles in the vicinity of said constrictions; and means for applying a dielectrophoric field to said substrate, wherein said polarizable particles are trapped in said gap when said dielectrophoric field is applied wherein said constrictions are formed of a material having a dielectric constant substantially less than a buffer in which the particles to be trapped are suspended.

25. The device of claim 1 wherein said constrictions are formed of silicon dioxide, polymide or PMMA.

* * * * *